United States Patent
Dutta

(10) Patent No.: US 11,477,138 B2
(45) Date of Patent: Oct. 18, 2022

(54) PACKET REORDERING IN PACKET SWITCHED NETWORKS

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/132,412

(22) Filed: Dec. 23, 2020

(65) Prior Publication Data

US 2022/0200933 A1    Jun. 23, 2022

(51) Int. Cl.
| | |
|---|---|
| *H04L 49/9057* | (2022.01) |
| *H04L 47/125* | (2022.01) |
| *H04L 12/46* | (2006.01) |
| *H04L 45/50* | (2022.01) |
| *H04L 69/22* | (2022.01) |
| *H04L 47/31* | (2022.01) |

(52) U.S. Cl.
CPC ...... *H04L 49/9057* (2013.01); *H04L 12/4633* (2013.01); *H04L 45/50* (2013.01); *H04L 47/125* (2013.01); *H04L 47/31* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 8,111,649 B1* | 2/2012 | Agarwall | H04L 12/00 370/328 |
| 2012/0327941 A1 | 12/2012 | Villamizar | |
| 2017/0366456 A1* | 12/2017 | Dara | H04L 45/26 |
| 2018/0176816 A1* | 6/2018 | Meylan | H04W 28/0268 |

(Continued)

OTHER PUBLICATIONS

Andersson, L., et al., "LDP Specification," Network Working Group, RFC 5036, Oct. 2007, 135 pages.

(Continued)

*Primary Examiner* — Christine T Duong
(74) *Attorney, Agent, or Firm* — Tong, Rea, Bentley & Kim, LLC

(57) ABSTRACT

Various example embodiments for controlling reordering of packets in packet switched networks are presented herein. Various example embodiments for controlling reordering of packets in packet switched networks may be configured to control reordering of packets in packet switched networks based on control of reorderability of packets in packet switched networks. Various example embodiments for controlling reordering of packets in packet switched networks may be configured to control reorderability of packets in packet switched networks, and, thus, reordering of packets in packet switched networks, based on use of a reorderability indicator (RI). The RI for a packet is included in the packet to indicate reorderability of the packet, where the reorderability of the packet is indicative as to whether or not reordering of the packet is permitted. The RI may be included in a packet for controlling reorderability and, thus, reordering, of the packet as the packet traverses a network.

24 Claims, 17 Drawing Sheets

(56) References Cited

U.S. PATENT DOCUMENTS

2019/0281025 A1  9/2019  Harriman et al.

OTHER PUBLICATIONS

Moy, J., "OSPF Version 2," Network Working Group, RFC 2328, Apr. 1998, 244 pages.

Coltun, R., et al., "OSPF for IPv6," Network Working Group, RFC 5340, Jul. 2008, 94 pages.

Callon, R.W., et al., "Use of OSI IS-IS for Routing in TCP/IP and Dual Environments," Network Working Group, RFC 1195, Dec. 1990, 68 pages.

Filsfils, C., et al., "Segment Routing Architecture," Internet Engineering Task Force, RFC 8402, Jul. 2018, 32 pages.

Bashandy, A., et al., "Segment Routing with the MPLS Data Plane," Internet Engineering Task Force, RFC 8660, Dec. 2019, 29 pages.

IEEE, "802.1aq—Shortest Path Bridging," printed from https://www.ieee802.org/1/pages/802.1aq.html on Mar. 30, 2022, 5 pages.

Fedyk, D., et al., "IS-IS Extensions Supporting IEEE 802.1aq Shortest Path Bridging," Internet Engineering Task Force, RFC 6329, Apr. 2012, 37 pages.

Postel, J., "Assigned Numbers," Network Working Group, RFC 739, Nov. 11, 1977, 11 pages.

Mathis, M., et al., "TCP Selective Acknowledgement Options," Network Working Group, RFC 2018, Oct. 1996, 12 pages.

Information Sciences Institute, "Internet Protocol, DARPA Internet Program, Protocol Specification," RFC 791, Sep. 1981, 51 pages.

Deering, S., et al., "Internet Protocol, Version 6 (IPv6) Specification," Network Working Group, RFC 2460, Dec. 1998, 39 pages.

Iana, "IEEE 802 Numbers," printed on Nov. 1, 2021, 1 page.

Iana, Special-Purpose Multiprotocol Label Switching (MPLS) Label Values, printed on Mar. 30, 2022, 2 pages.

EP Extended Search Report mailed in corresponding EP Application No. 21211197.5 dated Jun. 1, 2022, 9 pages.

\* cited by examiner

FIG. 11
IPv6 HOP-BY-HOP
OPTIONS HEADER
1100
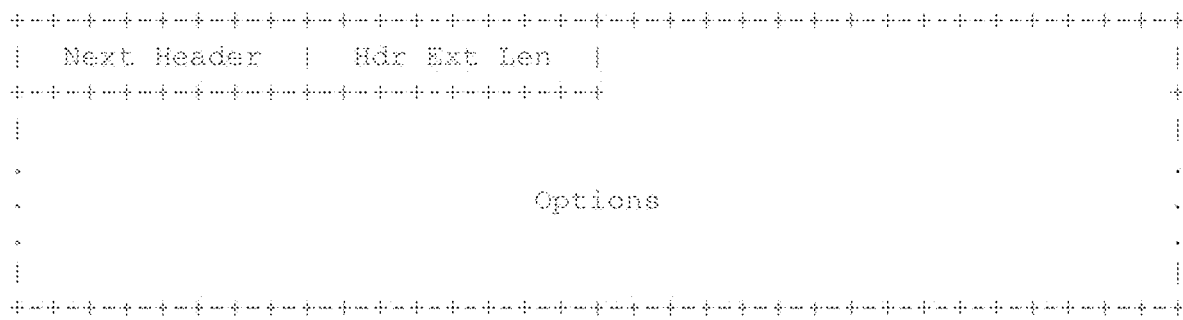
FIG. 12
TLV ENCODED
OPTION
1200
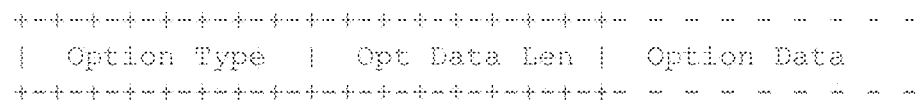
FIG. 13
RI OPTION HEADER
1300
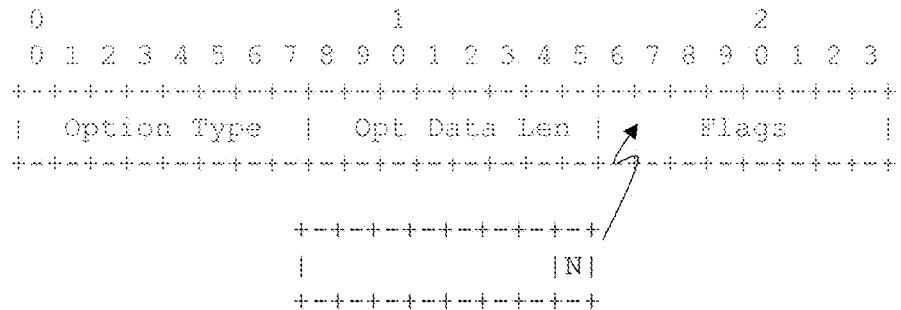

*FIG. 17*

RI LABEL
1700

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    RI                 | Exp |S|   TTL/Flags   |
+-+-+-+-+-+-+-+-+-+-+-+-+-+-+-+-+-+-+-+-+-+-+-+-+-+-+-+-+-+-+-+-+
|                 LSP Label             | Exp |S|      TTL      |
+-+-+-+-+-+-+-+-+-+-+-+-+-+-+-+-+-+-+-+-+-+-+-+-+-+-+-+-+-+-+-+-+
|                                                               |
+                     LSP Payload                               +
//                                                             //
//                                                             //
|                                                               |
+-+-+-+-+-+-+-+-+-+-+-+-+-+-+-+-+-+-+-+-+-+-+-+-+-+-+-+-+-+-+-+-+

RI LABEL
1800

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            RI                 | Exp |S|    TTL/Flags          |
+-+-+-+-+-+-+-+-+-+-+-+-+-+-+-+-+-+-+-+-+-+-+-+-+-+-+-+-+-+-+-+-+
|         LSP N Label           | Exp |S|       TTL             |
+-+-+-+-+-+-+-+-+-+-+-+-+-+-+-+-+-+-+-+-+-+-+-+-+-+-+-+-+-+-+-+-+
~                               .                               ~
~                               .                               ~
+-+-+-+-+-+-+-+-+-+-+-+-+-+-+-+-+-+-+-+-+-+-+-+-+-+-+-+-+-+-+-+-+
|            RI                 | Exp |S|    TTL/Flags          |
+-+-+-+-+-+-+-+-+-+-+-+-+-+-+-+-+-+-+-+-+-+-+-+-+-+-+-+-+-+-+-+-+
|         LSP 1 Label           | Exp |S|       TTL             |
+-+-+-+-+-+-+-+-+-+-+-+-+-+-+-+-+-+-+-+-+-+-+-+-+-+-+-+-+-+-+-+-+
|                                                               |
+              LSP Payload                                      +
//                                                             //
//                                                             //
|                                                               |
+-+-+-+-+-+-+-+-+-+-+-+-+-+-+-+-+-+-+-+-+-+-+-+-+-+-+-+-+-+-+-+-+
```

PACKET REORDERING IN PACKET SWITCHED NETWORKS

TECHNICAL FIELD

Various example embodiments relate generally to communication systems and, more particularly but not exclusively, to packet reordering in packet switched networks.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support communication of a packet including a reorderability indicator indicative of a reorderability of the packet. In at least some example embodiments, the reorderability indictor is indicative as to whether reordering of the packet is permitted. In at least some example embodiments, the reorderability indicator is indicative as to whether reordering of the packet is permitted with respect to a flow with which the packet is associated. In at least some example embodiments, the reorderability indicator is indicative that reordering of the packet is not permitted. In at least some example embodiments, to support communication of the packet, the set of instructions is configured to, when executed by the at least one processor, cause the apparatus to send the packet using per-flow load balancing. In at least some example embodiments, the reorderability indicator is indicative that reordering of the packet is permitted. In at least some example embodiments, to support communication of the packet, the set of instructions is configured to, when executed by the at least one processor, cause the apparatus to send the packet using per-packet load balancing. In at least some example embodiments, to support communication of the packet, the set of instructions is configured to, when executed by the at least one processor, cause the apparatus to determine that the packet may need to be reordered relative to a second packet received after the packet and transmit the packet before the second packet based on a determination that the reorderability indicator of the packet indicates that reordering of the packet is not permitted. In at least some example embodiments, to support communication of the packet, the set of instructions is configured to, when executed by the at least one processor, cause the apparatus to determine that the packet may need to be reordered relative to a second packet received after the packet and transmit the second packet before the packet based on a determination that the reorderability indicator of the packet indicates that reordering of the packet is permitted. In at least some example embodiments, to support communication of the packet, the set of instructions is configured to, when executed by the at least one processor, cause the apparatus to receive, by a node having a default behavior of enforcing in-order delivery of packets, the packet and a second packet, wherein the second packet is received after the packet, determine, by the node, that the reorderability indicator of the packet indicates that the packet is permitted to be reordered, and transmit, by the node, the packet and the second packet such that the packet is transmitted after the second packet. In at least some example embodiments, to support communication of the packet, the set of instructions is configured to, when executed by the at least one processor, cause the apparatus to receive, by a node having a default behavior of allowing reordering of packet, the packet and a second packet, wherein the second packet is received after the packet, determine, by the node, that the reorderability indicator of the packet indicates that the packet is not permitted to be reordered, and transmit, by the node, the packet and the second packet such that the packet is transmitted before the second packet. In at least some example embodiments, the reorderability indicator is encoded within an Internet Protocol version 4 (IPv4) Options Header. In at least some example embodiments, the reorderability indicator is encoded within an Internet Protocol version 6 (IPv6) Extension Header (EH). In at least some example embodiments, the IPv6 EH is a Hop-by-Hop Options Header. In at least some example embodiments, the reorderability indicator is encoded within a reorderability indicator tag. In at least some example embodiments, the reorderability indictor tag is appended to an Ethernet header to which the reorderability indicator is applicable. In at least some example embodiments, the reorderability indictor tag is appended to a virtual local area network (VLAN) tag to which the reorderability indicator is applicable. In at least some example embodiments, the reorderability indicator is encoded within a Multiprotocol Label Switching (MPLS) label. In at least some example embodiments, the MPLS label is positioned above a label of a label switched path (LSP) to which the reorderability indicator is applicable. In at least some example embodiments, the MPLS label is positioned below a label of a label switched path (LSP) to which the reorderability indicator is applicable. In at least some example embodiments, to support communication of the packet, the set of instructions is configured to, when executed by the at least one processor, cause the apparatus to determine that the packet, which is associated with a first communication layer, is to be encapsulated by an encapsulation at a second communication layer and encode the reorderability indicator into the encapsulation at the second communication layer. In at least some example embodiments, the first communication layer and the second communication layer use a common communication protocol. In at least some example embodiments, the first communication layer and the second communication layer use different communication protocols.

In at least some example embodiments, a non-transitory computer-readable medium stores a set of instructions configured to cause an apparatus to support communication of a packet including a reorderability indicator indicative of a reorderability of the packet. In at least some example embodiments, the reorderability indictor is indicative as to whether reordering of the packet is permitted. In at least some example embodiments, the reorderability indicator is indicative as to whether reordering of the packet is permitted with respect to a flow with which the packet is associated. In at least some example embodiments, the reorderability indicator is indicative that reordering of the packet is not permitted. In at least some example embodiments, to support communication of the packet, the set of instructions is configured to cause the apparatus to send the packet using per-flow load balancing. In at least some example embodiments, the reorderability indicator is indicative that reordering of the packet is permitted. In at least some example embodiments, to support communication of the packet, the set of instructions is configured to cause the apparatus to send the packet using per-packet load balancing. In at least some example embodiments, to support communication of the packet, the set of instructions is configured to cause the apparatus to determine that the packet may need to be reordered relative to a second packet received after the packet and transmit the packet before the second packet based on a determination that the reorderability indicator of the packet indicates that reordering of the packet is not permitted. In at least some example embodiments, to support communication of the packet, the set of instructions is configured to cause the apparatus to determine that the packet may need to be reordered relative to a second packet received after the packet and transmit the second packet before the packet based on a determination that the reorderability indicator of the packet indicates that reordering of the packet is permitted. In at least some example embodiments, to support communication of the packet, the set of instructions is configured to cause the apparatus to receive, by a node having a default behavior of enforcing in-order delivery of packets, the packet and a second packet, wherein the second packet is received after the packet, determine, by the node, that the reorderability indicator of the packet indicates that the packet is permitted to be reordered, and transmit, by the node, the packet and the second packet such that packet is transmitted after the second packet. In at least some example embodiments, to support communication of the packet, the set of instructions is configured to cause the apparatus to receive, by a node having a default behavior of allowing reordering of packet, the packet and a second packet, wherein the second packet is received after the packet, determine, by the node, that the reorderability indicator of the packet indicates that the packet is not permitted to be reordered, and transmit, by the node, the packet and the second packet such that the packet is transmitted before the second packet. In at least some example embodiments, the reorderability indicator is encoded within an Internet Protocol version 4 (IPv4) Options Header. In at least some example embodiments, the reorderability indicator is encoded within an Internet Protocol version 6 (IPv6) Extension Header (EH). In at least some example embodiments, the IPv6 EH is a Hop-by-Hop Options Header. In at least some example embodiments, the reorderability indicator is encoded within a reorderability indicator tag. In at least some example embodiments, the reorderability indictor tag is appended to an Ethernet header to which the reorderability indicator is applicable. In at least some example embodiments, the reorderability indictor tag is appended to a virtual local area network (VLAN) tag to which the reorderability indicator is applicable. In at least some example embodiments, the reorderability indicator is encoded within a Multiprotocol Label Switching (MPLS) label. In at least some example embodiments, the MPLS label is positioned above a label of a label switched path (LSP) to which the reorderability indicator is applicable. In at least some example embodiments, the MPLS label is positioned below a label of a label switched path (LSP) to which the reorderability indicator is applicable. In at least some example embodiments, to support communication of the packet, the set of instructions is configured to cause the apparatus to determine that the packet, which is associated with a first communication layer, is to be encapsulated by an encapsulation at a second communication layer and encode the reorderability indicator into the encapsulation at the second communication layer. In at least some example embodiments, the first communication layer and the second communication layer use a common communication protocol. In at least some example embodiments, the first communication layer and the second communication layer use different communication protocols.

In at least some example embodiments, a method includes supporting communication of a packet including a reorderability indicator indicative of a reorderability of the packet. In at least some example embodiments, the reorderability indictor is indicative as to whether reordering of the packet is permitted. In at least some example embodiments, the reorderability indicator is indicative as to whether reordering of the packet is permitted with respect to a flow with which the packet is associated. In at least some example embodiments, the reorderability indicator is indicative that reordering of the packet is not permitted. In at least some example embodiments, supporting communication of the packet includes sending the packet using per-flow load balancing. In at least some example embodiments, the reorderability indicator is indicative that reordering of the packet is permitted. In at least some example embodiments, supporting communication of the packet includes sending the packet using per-packet load balancing. In at least some example embodiments, supporting communication of the packet includes determining that the packet may need to be reordered relative to a second packet received after the packet and transmitting the packet before the second packet based on a determination that the reorderability indicator of the packet indicates that reordering of the packet is not permitted. In at least some example embodiments, supporting communication of the packet includes determining that the packet may need to be reordered relative to a second packet received after the packet and transmitting the second packet before the packet based on a determination that the reorderability indicator of the packet indicates that reordering of the packet is permitted. In at least some example embodiments, supporting communication of the packet includes receiving, by a node having a default behavior of enforcing in-order delivery of packets, the packet and a second packet, wherein the second packet is received after the packet, determining, by the node, that the reorderability indicator of the packet indicates that the packet is permitted to be reordered, and transmitting, by the node, the packet and the second packet such that the packet is transmitted after the second packet. In at least some example embodiments, supporting communication of the packet includes receiving, by a node having a default behavior of allowing reordering of packet, the packet and a second packet, wherein the second packet is received after the packet, determining, by the node, that the reorderability indicator of the packet indicates that the packet is not permitted to be reordered, and transmitting, by the node, the packet and the second packet such that the packet is transmitted before the second packet. In at least some example embodiments, the reorderability indicator is encoded within an Internet Protocol version 4 (IPv4) Options Header. In at least some example embodiments, the reorderability indicator is encoded within an Internet Protocol version 6 (IPv6) Extension Header (EH). In at least some example embodiments, the IPv6 EH is a Hop-by-Hop Options Header. In at least some example embodiments, the reorderability indicator is encoded within a reorderability indicator tag. In at least some example embodiments, the reorderability indictor tag is appended to an Ethernet header to which the reorderability indicator is applicable. In at least some example embodiments, the reorderability indictor tag is appended to a virtual local area network (VLAN) tag to which the reorderability indicator is applicable. In at least some example embodiments, the reorderability indicator is encoded within a Multiprotocol Label Switching (MPLS)

label. In at least some example embodiments, the MPLS label is positioned above a label of a label switched path (LSP) to which the reorderability indicator is applicable. In at least some example embodiments, the MPLS label is positioned below a label of a label switched path (LSP) to which the reorderability indicator is applicable. In at least some example embodiments, supporting communication of the packet includes determining that the packet, which is associated with a first communication layer, is to be encapsulated by an encapsulation at a second communication layer and encoding the reorderability indicator into the encapsulation at the second communication layer. In at least some example embodiments, the first communication layer and the second communication layer use a common communication protocol. In at least some example embodiments, the first communication layer and the second communication layer use different communication protocols.

In at least some example embodiments, an apparatus includes means for supporting communication of a packet including a reorderability indicator indicative of a reorderability of the packet. In at least some example embodiments, the reorderability indictor is indicative as to whether reordering of the packet is permitted. In at least some example embodiments, the reorderability indicator is indicative as to whether reordering of the packet is permitted with respect to a flow with which the packet is associated. In at least some example embodiments, the reorderability indicator is indicative that reordering of the packet is not permitted. In at least some example embodiments, the means for supporting communication of the packet includes means for sending the packet using per-flow load balancing. In at least some example embodiments, the reorderability indicator is indicative that reordering of the packet is permitted. In at least some example embodiments, the means for supporting communication of the packet includes means for sending the packet using per-packet load balancing. In at least some example embodiments, the means for supporting communication of the packet includes means for determining that the packet may need to be reordered relative to a second packet received after the packet means for transmitting the packet before the second packet based on a determination that the reorderability indicator of the packet indicates that reordering of the packet is not permitted. In at least some example embodiments, the means for supporting communication of the packet includes means for determining that the packet may need to be reordered relative to a second packet received after the packet and means for transmitting the second packet before the packet based on a determination that the reorderability indicator of the packet indicates that reordering of the packet is permitted. In at least some example embodiments, the means for supporting communication of the packet includes means for receiving, by a node having a default behavior of enforcing in-order delivery of packets, the packet and a second packet, wherein the second packet is received after the packet, means for determining, by the node, that the reorderability indicator of the packet indicates that the packet is permitted to be reordered, and means for transmitting, by the node, the packet and the second packet such that the packet is transmitted after the second packet. In at least some example embodiments, the means for supporting communication of the packet includes means for receiving, by a node having a default behavior of allowing reordering of packet, the packet and a second packet, wherein the second packet is received after the packet, means for determining, by the node, that the reorderability indicator of the packet indicates that the packet is not permitted to be reordered, and means for transmitting, by the node, the packet and the second packet such that the packet is transmitted before the second packet. In at least some example embodiments, the reorderability indicator is encoded within an Internet Protocol version 4 (IPv4) Options Header. In at least some example embodiments, the reorderability indicator is encoded within an Internet Protocol version 6 (IPv6) Extension Header (EH). In at least some example embodiments, the IPv6 EH is a Hop-by-Hop Options Header. In at least some example embodiments, the reorderability indicator is encoded within a reorderability indicator tag. In at least some example embodiments, the reorderability indictor tag is appended to an Ethernet header to which the reorderability indicator is applicable. In at least some example embodiments, the reorderability indictor tag is appended to a virtual local area network (VLAN) tag to which the reorderability indicator is applicable. In at least some example embodiments, the reorderability indicator is encoded within a Multiprotocol Label Switching (MPLS) label. In at least some example embodiments, the MPLS label is positioned above a label of a label switched path (LSP) to which the reorderability indicator is applicable. In at least some example embodiments, the MPLS label is positioned below a label of a label switched path (LSP) to which the reorderability indicator is applicable. In at least some example embodiments, the means for supporting communication of the packet includes means for determining that the packet, which is associated with a first communication layer, is to be encapsulated by an encapsulation at a second communication layer and means for encoding the reorderability indicator into the encapsulation at the second communication layer. In at least some example embodiments, the first communication layer and the second communication layer use a common communication protocol. In at least some example embodiments, the first communication layer and the second communication layer use different communication protocols.

BRIEF DESCRIPTION OF THE DRAWINGS

The teachings herein can be readily understood by considering the following detailed description in conjunction with the accompanying drawings, in which:

FIG. 11 depicts an example embodiment of an IPv6 Hop-by-Hop Options Header configured for use to provide an RI Option Header in an IPv6 Header for supporting reorderability;

FIG. 12 depicts an example embodiment of a TLV encoded option configured for use in an IPv6 Hop-by-Hop Options Header in an IPv6 Header to provide an RI Option Header in an IPv6 Header for supporting reorderability;

FIG. 13 depicts an example embodiment of a TLV encoded option of an IPv6 Hop-by-Hop Options Header configured for use as an RI Option Header in an IPv6 Header;

FIG. 17 depicts an example embodiment of an RI label which may be used within an MPLS label stack in an MPLS packet;

FIG. 18 depicts an example embodiment of an MPLS label stack for illustrating cross-layer propagation of RI;

To facilitate understanding, identical reference numerals have been used herein, wherever possible, in order to designate identical elements that are common among the various figures.

DETAILED DESCRIPTION

Various example embodiments for controlling reordering of packets in packet switched networks are presented herein. Various example embodiments for controlling reordering of packets in packet switched networks may be configured to control reordering of packets in packet switched networks based on control of reorderability of packets in packet switched networks. Various example embodiments for controlling reordering of packets in packet switched networks may be configured to control reorderability of packets in packet switched networks, and, thus, reordering of packets in packet switched networks, based on use of a reorderability indicator (RI). The RI for a packet is included in the packet to indicate reorderability of the packet, where the reorderability of the packet is indicative as to whether or not reordering of the packet is permitted. The RI may be included in a packet for controlling reorderability and, thus, reordering, of the packet as the packet traverses a network. The RI may be included in a packet by a source node of the packet or by a forwarding node along a path traversed by the packet through the network. The RI may be used by nodes along the path traversed by the packet to control reordering of the packet as the packet traverses the path through the network. The RI may be used to control reorderability, and, thus, reordering, of packets in various types of packet switched networks, such as Internet Protocol (IP) networks (e.g., IP version 4 (IPv4) networks, IP version 6 (IPv6) networks, or the like), Ethernet networks, Multiprotocol Label Switching (MPLS) networks, or the like, as well as various combinations thereof. The encoding of the RI within packets may vary across the various types of packet switched networks in which RIs may be used. It will be appreciated that these and various other example embodiments, and advantages or potential advantages, of controlling reordering of packets in packet switched networks may be further understood by way of reference to the various figures, which are discussed further below.

Figure 1:
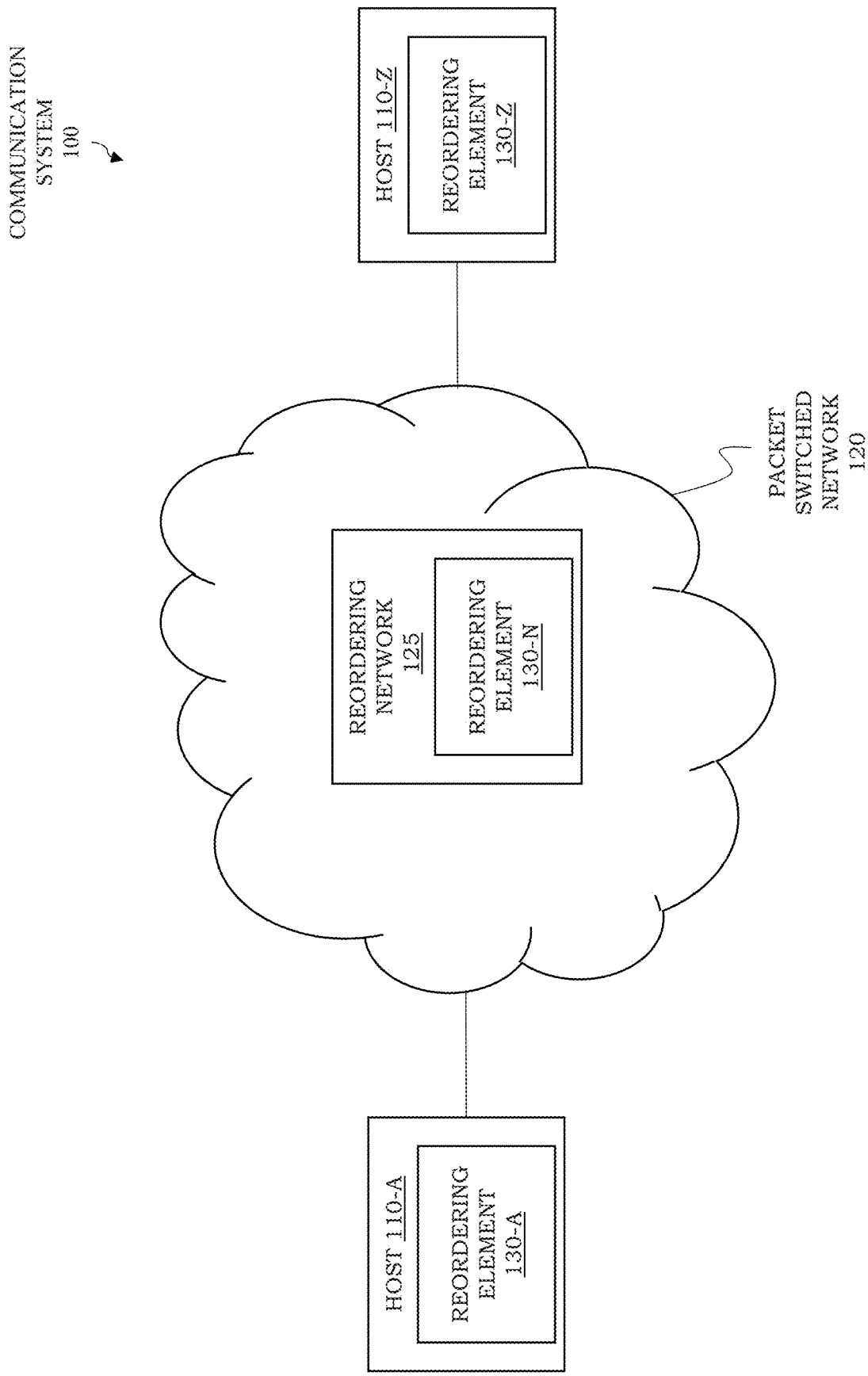
FIG. 1 depicts an example embodiment of a communication system including a packet switched network configured to support packet reordering functions.

FIG. 1 depicts an example embodiment of a communication system including a packet switched network configured to support packet reordering functions.

The communication system 100 includes a pair of hosts 110-A and 110-Z (collectively, hosts 110) and a packet switched network 120 configured to support communications between the hosts 110.

The hosts 110 may be any devices which may communicate over a packet switched network such as the packet switched network 120. For example, the hosts 110 may be endpoint devices (e.g., smartphones, desktop computers, laptop computers, tablets, smart televisions, gaming systems, Internet-of-Things (IoT) devices, or the like), network devices (e.g., routers, switches, bridges, gateways, servers, virtual machines, or the like), or the like. The hosts 110 may be configured to support communication of packets based on a RI (e.g., encoding of the RI into packets, handling of packets based on the RI, or the like, as well as various combinations thereof). It will be appreciated that the hosts 110-A and 110-Z may include reordering elements 130-A and 130-Z, respectively, configured to support communication of packets based on a RI.

The packet switched network 120 is configured to support communication of packets between the hosts 110. The packet switched network 120 may support communication of packets based on various packet switching technologies, including various communication layers, communication protocols, or the like, as well as various combinations thereof. For example, the packet switched network 120 may be configured to support packet switching technologies such as IP, Ethernet, MPLS, or the like, as well as various combinations thereof. The packet switched network 120 includes a reordering network 125, which may form all of the packet switch network 120 or part of the packet switched network 120. It will be appreciated that multiple reordering networks may form part of the packets switched network 120.

The reordering network 125 is configured to support communication of packets using packet reordering. The reordering network 125 may represent one or more nodes of the packet switched network 120 configured to support communication of packets using packet reordering (e.g., a single node, multiple nodes, multiple nodes associated as a network, or the like). The reordering network 125 may be configured to use (1) a default mode of operation in which in-order delivery of packets is enforced unless a packet includes an RI indicative that reordering of the packet is permitted or (2) a default mode of operation in which reordering of packets is permitted unless a packet includes an RI indicative that reordering of the packet is not permitted. The reordering network 125 (e.g., one or more nodes of the reordering network 125) may be configured to support communication of packets based on the RI (e.g., encoding of the RI into packets, determining whether to reorder packets based on the RI encoded in the packets, and the like). It will be appreciated that the reordering network 125 may include a reordering element 130-N (which may be multiple elements distributed across multiple nodes where the reordering network 125 includes multiple nodes).

It will be appreciated that various aspects of supporting packet reordering in packet switched networks may be further understood by first considering various aspects of packet switched networks.

In a packet switched network, a node may have multiple paths to a destination. The multiple paths to a destination may be computed and used in various ways (e.g., using Equal Cost Multipath (ECMP) or Unequal Cost Multipath (UCMP), using flow-based routing or packet-based routing, or the like, as well as various combinations thereof). Various aspects of supporting packet reordering in packet switched networks, and in reordering networks within packet switched networks, may be further understood by first considering various aspects of such packet switched networks.

Figure 2:
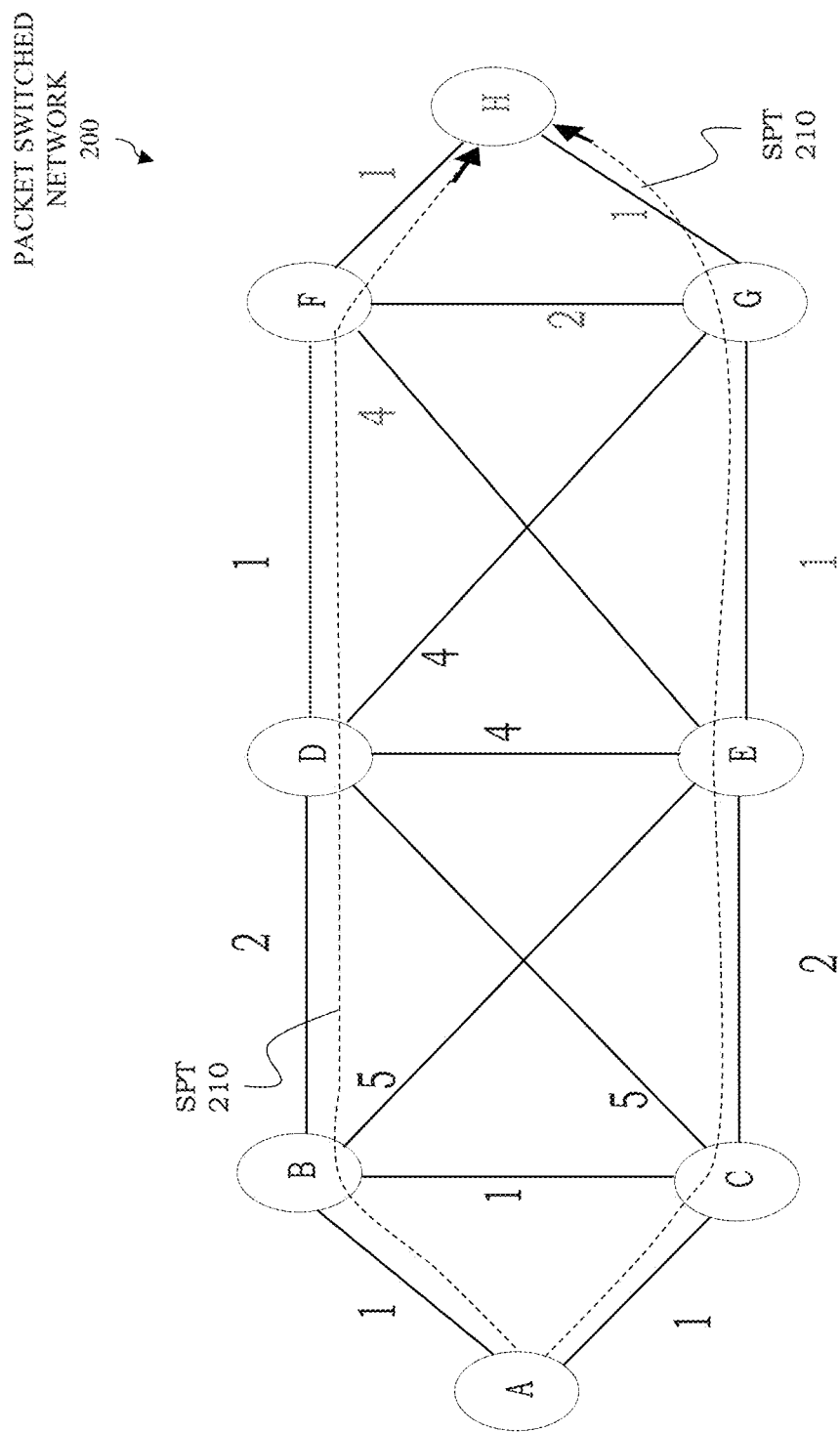
FIG. 2 depicts an example embodiment of a packet switched network for illustrating ECMP in shortest path routed networks.

FIG. 2 depicts an example embodiment of a packet switched network for illustrating ECMP in shortest path routed networks.

The packet switched network 200 includes eight nodes which are labeled as node A through node H. In FIG. 2, a link from node X to node Y is denoted as X–>Y. So, X–>Y and Y–>X are two links of the same physical connection between X and Y and both X–>Y and Y–>X are jointly represented as X<–>Y.

In shortest path routing, every link is assigned a cost (which also may be referred to as a distance or metric). Costs of the links in a physical connection may be asymmetric. For example, B–>D and D–>B may have different costs; however, for simplicity and without loss of generality, the costs of links of a physical connection are considered as symmetric in the packet switched network 200 of FIG. 2. Each node builds an identical topology database of the network, where the topology database is the graph of the network that includes its nodes as vertices and links as the edges. Then, each node independently computes paths to each known destination by running a Shortest Path Tree (SPT) algorithm (e.g., Dijkstra's Algorithm) on the topology database. A packet to a destination always follows the shortest path to the destination along the network. The SPT algorithm guarantees that the first shortest path from a first node to a destination includes the shortest path from every transit node (traversed by the first shortest path) to that destination. So, the shortest path from a node to a destination is coherent in all transit nodes along the path and the path is loop-free. The first node forwards a packet to the next-hop along the first shortest path to the destination encoded in the packet. Similarly, every transit node independently makes the forwarding decision on the packet based on the shortest path to the destination encoded in the packet. This model of forwarding is also called "destination based routing".

In IP networks, for example, each node/router uses an Interior Gateway Protocol (IGP) in order to flood the status of its adjacent links and local networks across the network. Using this flooding mechanism, each router builds an identical topology database of the network. Then, IGPs at each router compute the IP routes to every other node (destination) using the SPT algorithm and build its IP routing table. For example, the IGPs may include Open Shortest Path First (OSPF), Intermediate-System-to-Intermediate-System (IS-IS), OSPF version 3 (OSPFv3), or the like. So, routers within the IGP forward packets to respective destinations along the shortest path(s) to the destination. In the case of IP networks, the destination entries in the table would be IP prefixes, especially the IP addresses of the nodes.

In MPLS networks, the shortest path label switched paths (LSPs) to destinations are set-up by protocols such as Label Distribution Protocol (LDP) or Segment Routing (e.g., SR, SR-MPLS, or the like), which are based on the shortest path IP routes computed by the IGPs.

In Shortest Path Bridging (SPB)-based Ethernet networks, the shortest paths to various destination bridges are computed by IS-IS. Ethernet packets from a source bridge to a destination bridge are sent along the shortest path to the destination bridge.

In FIG. 2, the SPT 210 computed by node A to teach all remaining nodes B-H includes the following paths from node A to the nodes B-H: (1) To B=>A->B of cost 1, (2) To C=>A->C of cost 1, (3) To D=>A->B->D of cost 3, (4) To E=>A->C->E of cost 3, (5), To F=>A->B->D->F of cost 4, (6) To G=>A->C->E->G of cost 4, (7) To H=>A->B->D->G->H of cost 5 (Path 1), and (8) A->C->E->G->H of cost 5 (Path 2). As is evident, there are two ECMP paths from node A to node H, denoted as Path 1 and Path 2 and each of cost 5. So, to maximize throughput, node A can load balance the packets to H across the two ECMP paths, A->C->E->G->H and A->B->D->F->H, respectively. Node A can perform the load balancing using per-flow load balancing or per-packet load balancing.

In per-flow load balancing, a path for a packet is chosen after hashing on a few fields in the header(s) of a packet. The combination of such fields is termed as a "flow" from a load balancing perspective. For example, a packet flow may be all packets to a specific destination with a specific forwarding class (FC), all packets between a source and a destination with specific source and destination ports in the transport layer (e.g., TCP, UDP, SCTP, or the like) which means that packets from a specific application constitute the flow. So, packets belonging to a specific flow are always sent along a fixed path in the ECMP set. Thus, while this scheme ensures in-order delivery of packets of a flow at their destination, one limitation of per-flow load balancing is that, if a majority of the packets to a destination hash to the same path, then it results in unfair load balancing in ECMP.

In per-packet load balancing, which may be used to address the unfairness of load distribution in per-flow load balancing, the packets to a destination may be sprayed evenly across all paths in the ECMP to the destination. One simple way of per-packet load balancing is to spray subsequent packets across each path in the ECMP in a round-robin manner. For example, if A sends a sequence of packets P1, P2, P3, P4 to H then P1 is sent on Path 1, P2 is sent on Path 2, P3 is sent on Path 1 and P4 is sent on Path 2. It is noted that per-packet load balancing in UCMP also is possible (e.g. using randomized load balancing (RLB), which may be considered to be a deviation from the shortest path routing paradigm).

In shortest path routing, all packet to a destination are forwarded along the common shortest path to the destination, whereas alternate paths to the destination remain unutilized. As a result, the shortest path may get overloaded, leading to congestion and packet drops. In addition to that, shortest paths to multiple destinations may share common links and, thus, exacerbate the congestion in shared links. ECMP mitigates the problem to a certain extent by load balancing packets to a destination along multiple equal cost shortest paths, but ECMP suffers from following limitations: (1) ECMP is topology dependent and is not always possible in all network topologies and (2) even if ECMP is possible, non-ECMP alternate paths to a destination still may remain unutilized.

Figure 3:
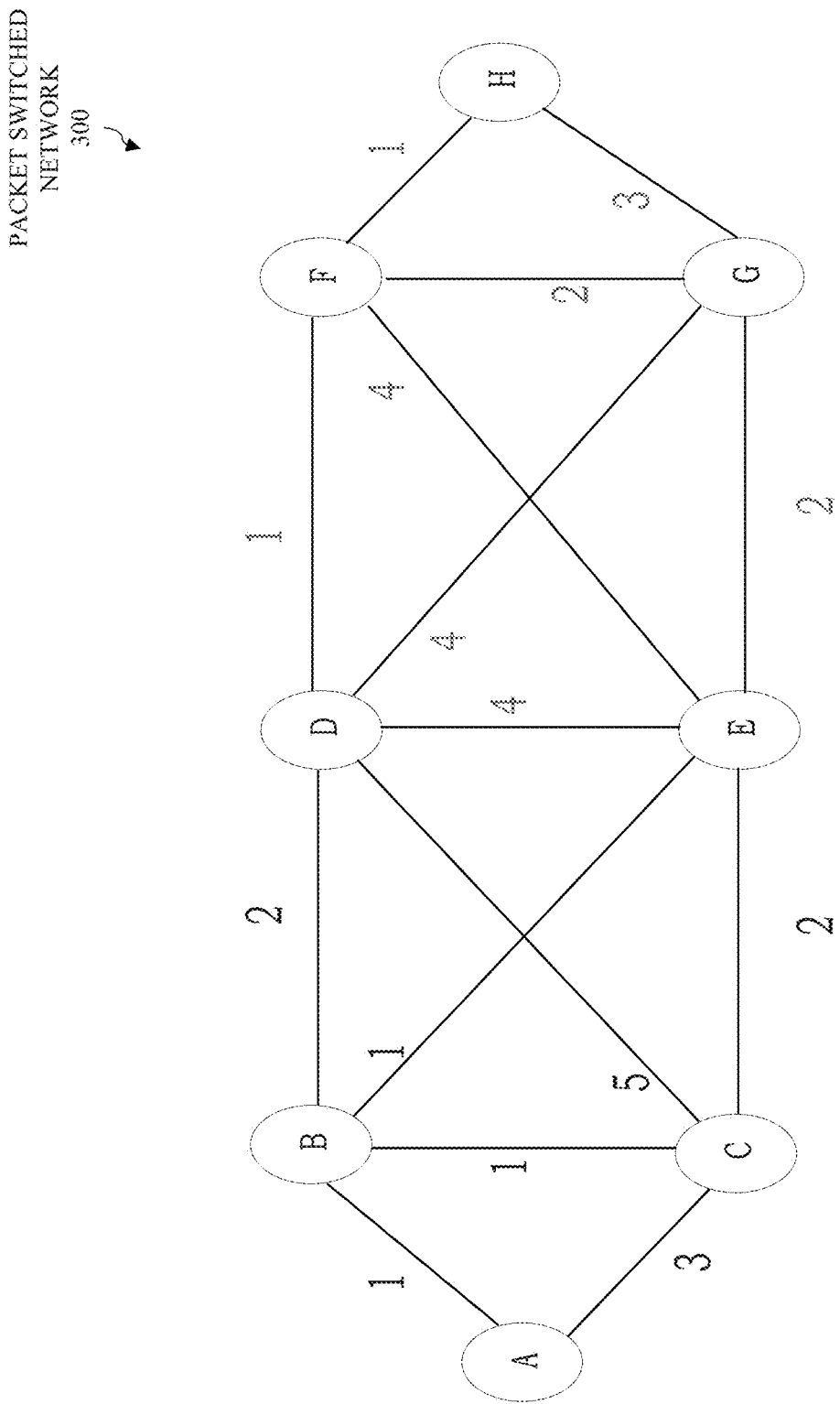
FIG. 3 depicts an example embodiment of a packet switched network which is a variant of the packet switched network of FIG. 2.
Figure 4:
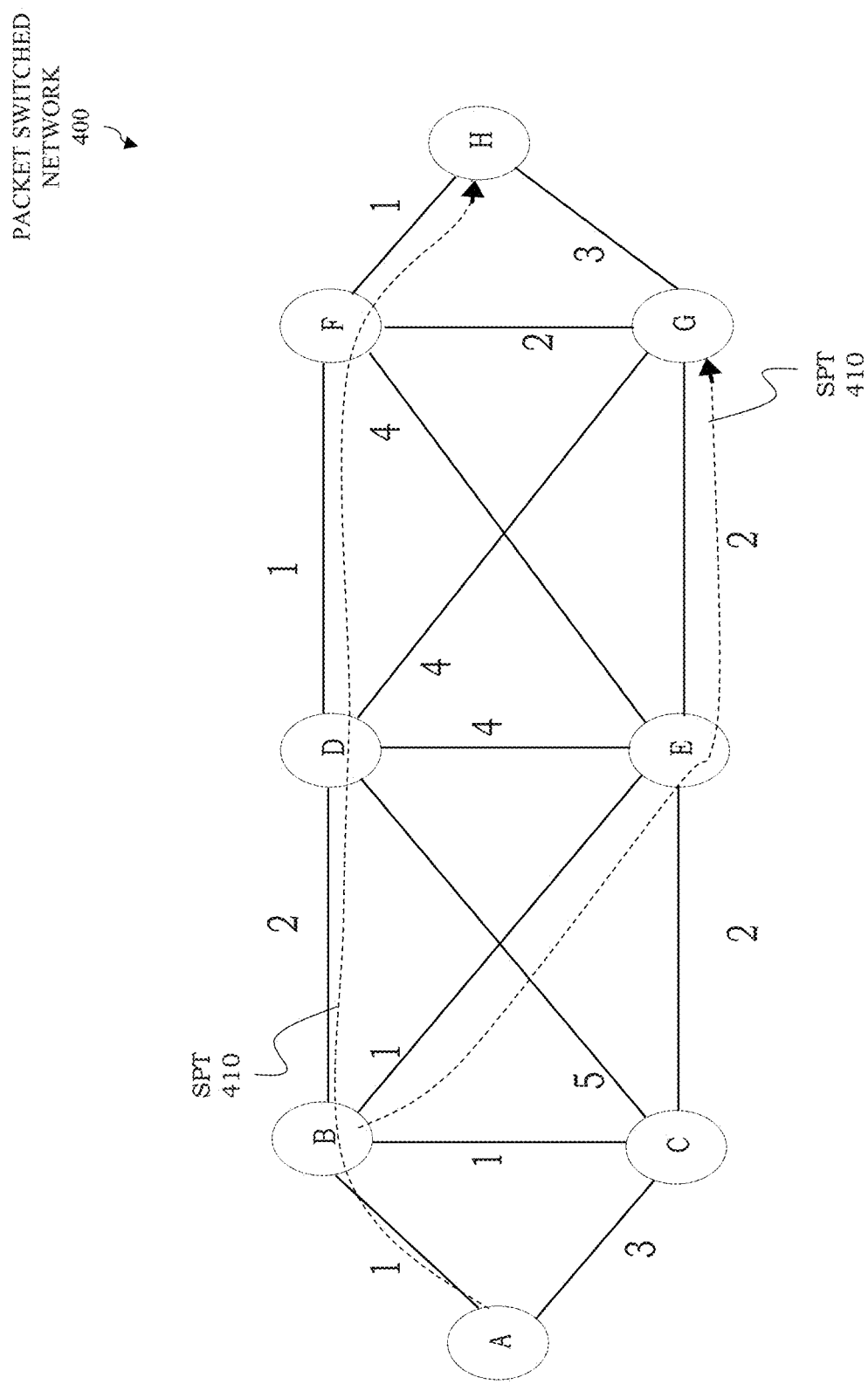
FIG. 4 depicts an example embodiment of the packet switched network of FIG. 3 for illustrating a shortest path tree for use in shortest path routing.
Figure 5:
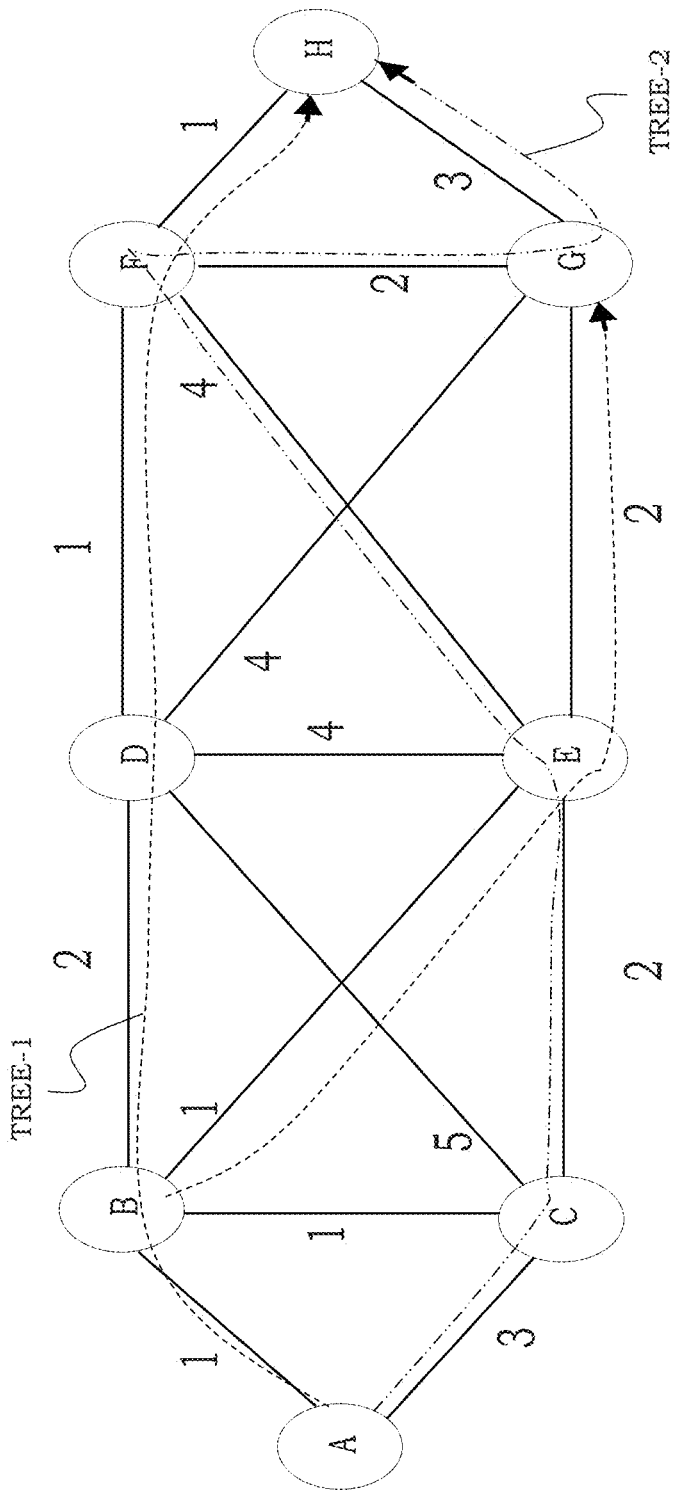
FIG. 5 depicts an example embodiment of the packet switched network of FIG. 3 for illustrating a pair of maximally disjoint trees for use in randomized load balancing based routing.

As indicated above, at least some such limitations of per-flow load balancing and ECMP may be overcome based on use of an RLB scheme, which may be further understood by way of reference to FIGS. 3-5. FIG. 3 depicts an example embodiment of a packet switched network which is a variant of the packet switched network of FIG. 2. FIG. 4 depicts an example embodiment of the packet switched network of FIG. 3 for illustrating a shortest path tree for use in shortest path routing. FIG. 5 depicts an example embodiment of the packet switched network of FIG. 3 for illustrating a pair of maximally disjoint trees for use in RLB-based routing.

In FIG. 3, the packet switched network 300 is similar to the packet switched network 200 of FIG. 2, with the difference being that a few of the link costs have been modified.

In FIG. 4, the packet switched network 400 is identical to the packet switched network 300 of FIG. 3. The packet switched network 400 includes an SPT 410 that is configured such that ECMP is not possible from node A to node H; however, alternate paths exist between node A and node H and these alternate paths remain unutilized by the traffic going from node A to node B.

In RLB, packets to a destination may be sprayed fairly (e.g., evenly) across all possible paths to the destination, irrespective of the flows with which the packet are associated. This ensures optimal utilization of all network resources, thereby eliminating congestion or at least reducing it to the least possible level and maximizing throughput of packets. In RLB, a node computes as many maximally disjoint trees as possible to all destinations in the network, where maximally disjoint means that the links included in the trees are mutually exclusive. Then, packets to a destination are load balanced across the paths to the destination along the computed maximally disjoint trees, in a round robin fashion. Since RLB sprays packets evenly across all possible maximally disjoint paths to a destination, the scheme maximizes throughput and utilization of network resources. It is noted that, since the costs of the load balancing paths to a destination are not equal, RLB is a case of UCMP. RLB can be employed in various types of packet switched networks, including IP networks, Ethernet networks, and MPLS networks, among others.

In FIG. 5, the packet switched network 500 is identical to the packet switched network 300 of FIG. 3. In FIG. 5, various maximally disjoint trees from node A to connect the remaining nodes B-H are possible. In FIG. 5, two such maximally disjoint trees possible from node A to connect the remaining nodes B-H are presented. As a result, node A has two paths to each of the destinations B-H, each path via a specific tree. For example, node A has the following paths to node H: (1) in Tree-1, path A->B->D->F->H of cost 5 and (2) in Tree-2, path A->C->E->F->G->H of cost 14. Node A load balances packets evenly across the trees, distributing packets among the trees in round-robin manner. It is noted that each node independently computes maximally disjoint trees to the remaining nodes in the network and the trees are not coherent among the nodes. So, when a node sends a packet along a path of a tree, it encodes an ordered list of links or nodes of the path into the packet. Each transit node along the path pops the topmost entry in the list and forwards to its next-hop identified by the topmost entry. So, the RLB scheme described herein does not use destination based routing (although it will be appreciated that other schemes are possible).

In per-packet load balancing schemes, as indicated above, packets belonging to a flow are sprayed across the multiple paths to their destination. The latencies experienced by packets along each path may differ. Even though all load balancing paths to a destination may be ECMP (e.g., the case of paths from A to H in FIG. 2), the latency of each path may differ as latency is contributed to by dynamic factors such as congestion at the transit nodes and so forth. As a result, the packets belonging to a flow are reordered by the network and, thus, packets may reach their destination out-of-order. Additionally, a network may deploy techniques other than per-packet load balancing in ECMP or UCMP that may voluntarily reorder the packets of a flow. It will be appreciated that such a network that may involuntarily or voluntarily reorder packets may be referred to more generally as a reordering network (RN). An example of such an RN is depicted in FIG. 6.

Figure 6:
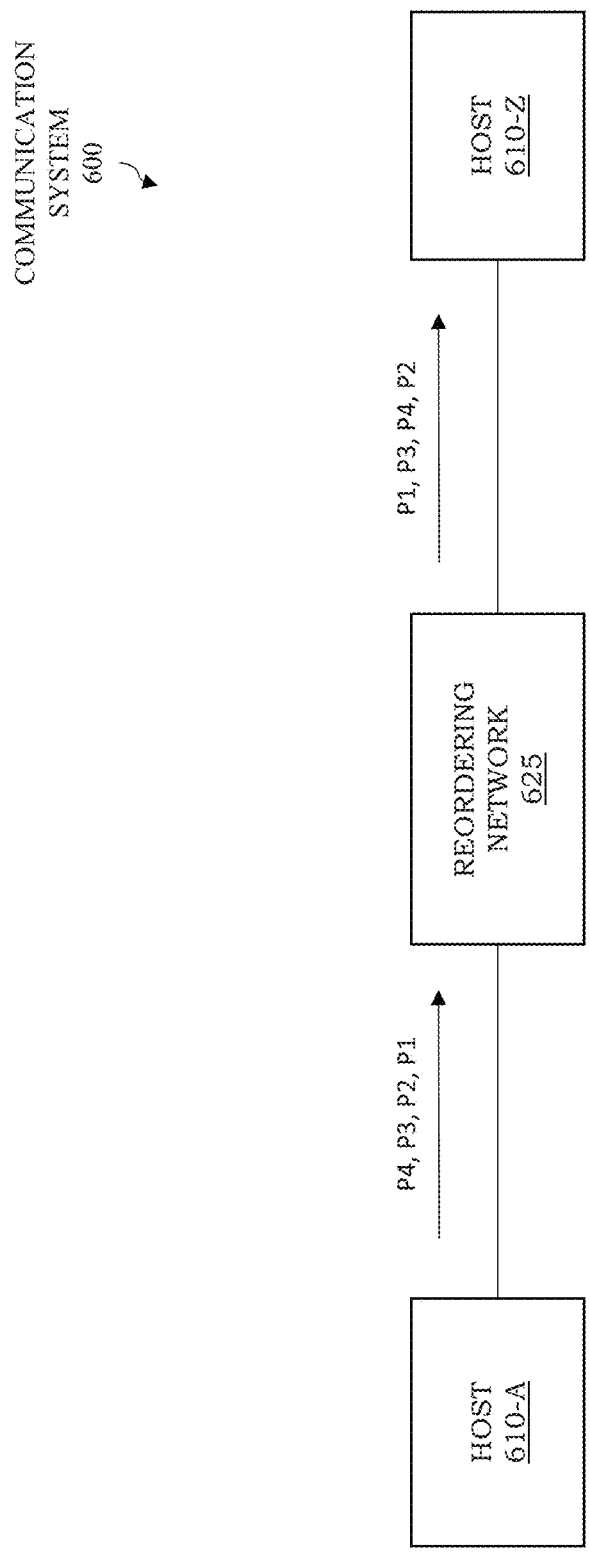
FIG. 6 depicts an example embodiment of a communication system including a reordering network that reorders packets as the packets traverse the reordering network.

FIG. 6 depicts an example embodiment of a communication system including a reordering network that reorders packets as the packets traverse the reordering network.

The communication system 600 includes a pair of hosts 610-A and 610-Z (collectively, hosts 610) and an RN 625. The hosts 610 are separated by a PSN that includes the RN 625. The host 610-A sent a sequence of packets [(first) P1, P2, P3, P4 (last)] to Host 610-Z. The RN 625 reordered the sequence of packets to [(first) P2, P4, P3, P1 (last)] and the packets arrived at host 610-Z in that order. If packets P1, P2, P3, P4 belonged to the same packet flow, then the packets of the flow arrived out-of-order at Host-B.

As indicated above, one side effect of packets traversing an RN is the possibility of out-of-order delivery of packets at the destination. It is noted that packet reordering is now considered naturally prevalent within complex networks like the Internet. Due to various reasons, such as multipath routing, route fluttering, and retransmissions, among others, packets belonging to a flow may arrive out of order at a destination anyway. As the delay difference between alternative paths decreases, the occurrence of out-of-order delivery also decreases. For example, in datacenter/WebScale networks, for the intra-DC traffic, the latency of packets across all paths is almost uniform. So the benefits of RN generally prevail over insignificant accounts out-of-order delivery that may occur in DC networks. In the past, packet reordering used to violate the design principles of some traffic control mechanisms in Transmission Control Protocol (TCP) and, thus, posed performance problems. TCP is the most popular transport layer protocol for the Internet. Reordering could cause performance problems for TCP's fast retransmission algorithm, which uses the arrival of duplicate acknowledgments to detect segment loss. Duplicate acknowledgments can be caused by the loss of a segment or by the reordering of segments by the network. To overcome such performance issues a number of mitigations have been added to TCP, such as Selective Acknowledgment (SACK), Duplicate SACK (D-SACK), or the like. SACK specified the use of the SACK option for acknowledging out-of-sequence data not covered by TCP's cumulative acknowledgement field. A TCP sender could then use this information for more robust operation in an environment of reordered packets, ACK loss, packet replication, and/or early retransmit timeouts. In addition to SACK or D-SACK, a host of other features are in place in various TCP implementations and, generally speaking, out-of-order delivery of packets is no longer a problem for TCP.

As indicated above, in general, out-of-order delivery of packets is not a pathological behavior in the Internet or networking applications; however, there are various real time applications (e.g., VoIP and the like) in which the performance depends on in-order delivery of packets and, similarly, there are custom applications (e.g., custom applications used within DCs) that depend on in-order delivery of packets. When such applications communicate across an RN, then the RN needs to make an exception for such packets and ensure in-order transmission. For example, the nodes in an RN could perform per-flow load balancing on such packets to ensure that packets of such applications (flows) are always sent on a fixed path among the multiple available paths. Currently, an RN is not able to make such exceptions since a node in an RN is not aware of reorderability preferences of packets of a flow; only the applications at the endpoints of the flow are aware of such requirements. Various example embodiments presented herein are configured to overcome such limitations based on explicit indication of reorderability preferences in packets such that nodes, based on the explicit indication of reorderability preferences in the packets, can determine whether to prevent packet reordering (e.g., by applying per-flow load balancing) or perform packet reordering (e.g., by applying per-packet load balancing).

In at least some example embodiments, support for reorderability may be provided based on inclusion of a reorderability indicator (RI) into packets. The RI indicates whether or not the packet in which the RI is included can be reordered as it traverses a network. The RI may be inserted into the packet by the originator of the packet. When a packet is to be forwarded by a node in an RN in such a way that the forwarding may reorder the packet, then the node in the RN looks for the presence of an RI in the packet. If an RI is present in the packet and indicates that the packet cannot be reordered, then the node forwards in a way that ensures in-order delivery. If an RI is present in the packet and indicates that the packet can be reordered, then the node forwards in a way that may result in reordering of the packet. It is noted that the encoding of the RI and the use of RI to control reordering of packets may depend on the default behavior of the reordering network, e.g., whether the default behavior of the RN is to permit reordering of packets (e.g., an example of which is presented in FIG. 7) or whether the default behavior of the RN is to ensure in-order delivery of packets (e.g., an example of which is presented in FIG. 8).

Figure 7:
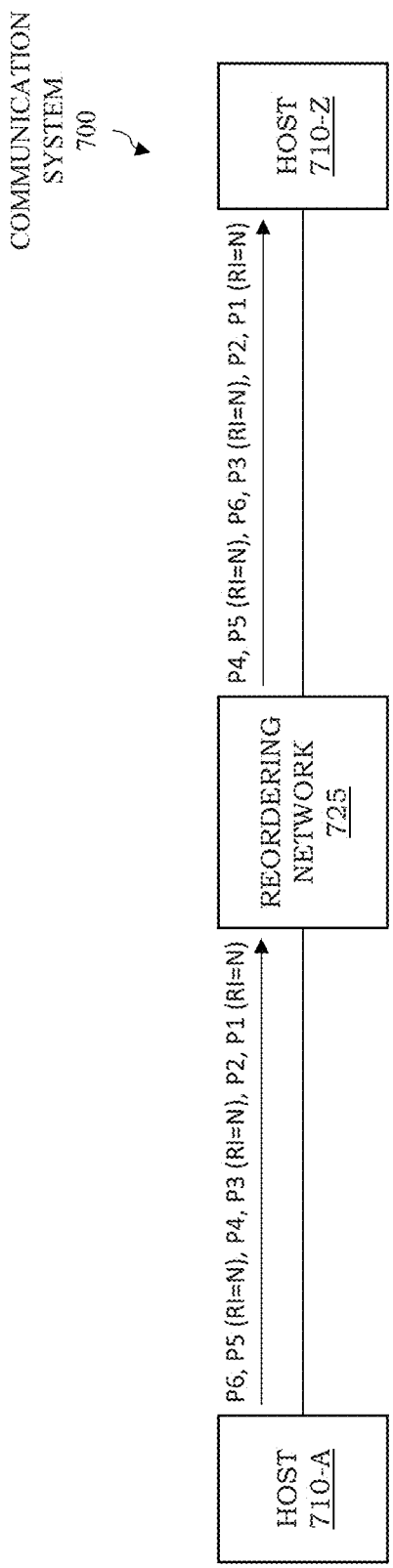
FIG. 7 depicts an example embodiment for use of a Reorderability Indicator (RI) to control reordering of packets in a reordering network in which the default behavior of the reordering network is to permit reordering of packets.

FIG. 7 depicts an example embodiment for use of an RI to control reordering of packets in a reordering network in which the default behavior of the reordering network is to permit reordering of packets.

The communication system 700 includes a pair of hosts 710-A and 710-Z (collectively, hosts 710) and an RN 725. The hosts 710 are separated by a PSN that includes the RN 725. In FIG. 7, Host-A is sending packets P1, P2, P3, P4, P5, P6 to Host-B. Packets P1, P3, P5 belong to an application that demands in-order delivery of packets. So, Host-A includes the RI into the packets P1, P3, and P5, with no reordering preference. The notations "RI=Y" is used for RI with reordering preference and "RI=N" is used for RI with no reordering preference. As a result, the sequence of packets egressing from the RN is P1, P5, P3, P6, P2, P4. So, packets P2, P4, P6 got reordered, but P1, P3, P5 remained in same order as they entered the RN.

For example, assume that the RN 725 in FIG. 7 is the shortest path routed network in FIG. 2, where node A has two ECMP paths to H. By default, node A performs per-packet load balancing of packets to H. When node A receives a packet from host 710-A that is to be forwarded to host 710-Z via node H, then node A looks for the presence of RI in the packet. If the packet includes RI (such as packets P1, P3, P5) which indicates that the packet cannot be reordered then node A performs per-flow load balancing on the packet.

Figure 8:
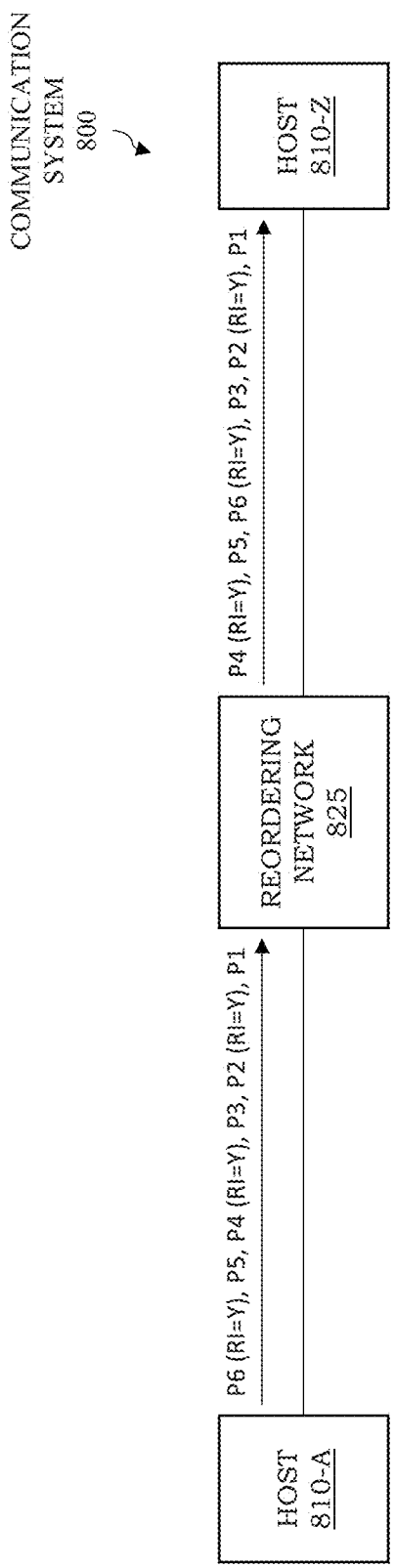
FIG. 8 depicts an example embodiment for use of an RI to control reordering of packets in a reordering network in which the default behavior of the reordering network is to ensure in-order delivery of packets.

FIG. 8 depicts an example embodiment for use of an RI to control reordering of packets in a reordering network in which the default behavior of the reordering network is to ensure in-order delivery of packets.

In FIG. 8, Host-A is sending packets P1, P2, P3, P4, P5, P6 to Host-B. Packets P2, P4, P6 are allowed to be reordered along their path. So, Host-A includes the RI into the packets P2, P4, and P6 with reordering preference. The notations "RI=Y" is used for RI with reordering preference and "RI=N" is used for RI with no reordering preference. As a result, the sequence of packets egressing from the RN is P1, P5, P3, P6, P5, P4. So, packets P2, P4, P6 got reordered, but packets P1, P3, P5 remained in the same order as they entered the RN.

For example, assume that the RN 825 in FIG. 8 is the shortest path routed network in FIG. 2, where node A has two ECMP paths to H. By default, node A performs per-flow load balancing of packets to H. When node A receives a packet from host 710-A that is to be forwarded to host 710-Z via node H, then node A looks for the presence of RI in the packet. If the packet includes RI (such as packets P2, P4, P6) which indicates that the packet can be reordered then node A performs per-packet load balancing on the packet.

It will be appreciated that, although primarily presented with respect to embodiments in which the host is aware of the reordering preferences of an RN and can encode the RI in only a portion of the packets in accordance with the reordering preferences of the RN, there may be cases in which the host is not aware of the reordering preferences of the RN, in which case the host may encode the RI into each packet (i.e., encoding RI=N for each packet that cannot be reordered and encoding RI=Y for each packet that can be reordered). For example, in FIG. 7, host 710-A may encode RI into each of the packets P1-P6, wherein packets P1, P3, and P5 are encoded with RI=N and packets P2, P4, and P6 are encoded with RI=Y. Similarly, for example, in FIG. 8, host 810-A may encode RI into each of the packets P1-P6, wherein packets P1, P3, and P5 are encoded with RI=N and packets P2, P4, and P6 are encoded with RI=Y.

It will be appreciated that the concept of RI is generic and is applicable to any packet switching technologies, such as IP, Ethernet, MPLS, or like, as well as various combinations thereof.

Various example embodiments for supporting use of the RI in various packet switching networks are presented below (e.g., for IPv4, IPv6, Ethernet, and MPLS).

In at least some example embodiments, the RI may be used within IPv4 packets to control reorderability, and, thus, reordering, of IPv4 packets.

Figure 9:
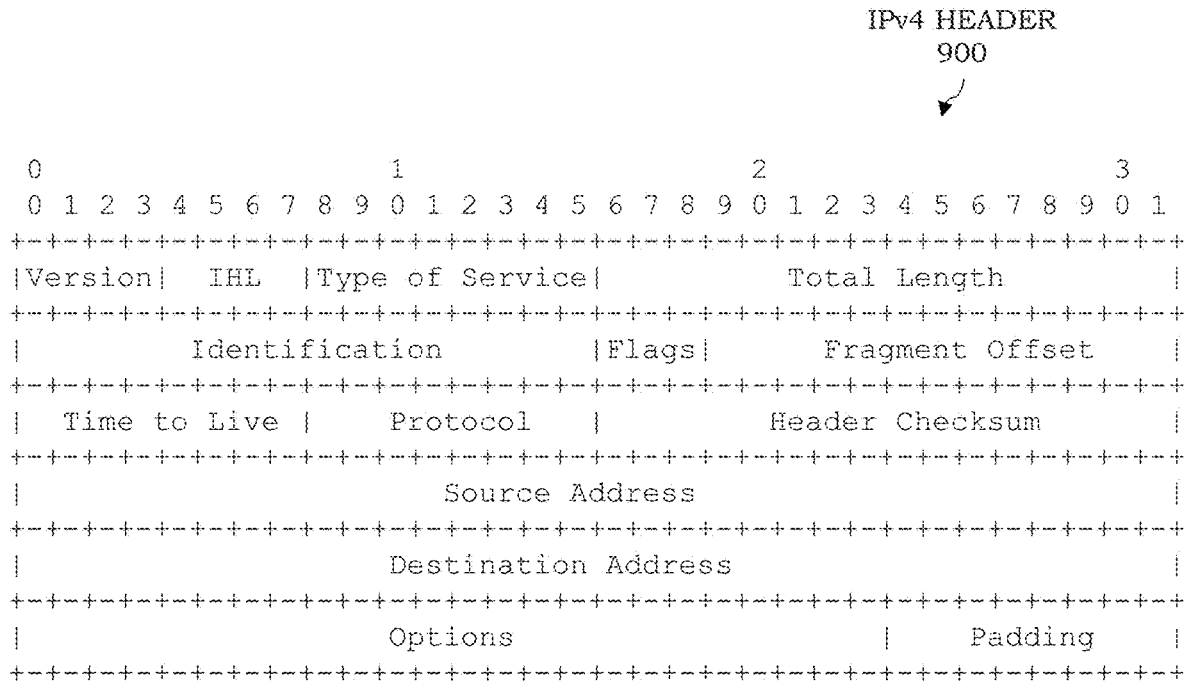
FIG. 9 depicts an example embodiment of an IPv4 Header including one or more IPv4 Options Headers configured for use to include an RI Option Header in an IPv4 Header for supporting reorderability.

The IPv4 Specification describes several Options that can be appended to an IPv4 Header. The Options provide for control functions needed or useful in some situations, but unnecessary for the most common communications. The Options include provisions for timestamps, security, special routing, and so forth. The Options start with a 1-octet Type field followed by type specific encoding. Options are of variable length. Thus, the minimum size of an Option is 1-octet (only type) if it does not have any type-specific data, while the maximum size of an Option is limited by the maximum permissible value of the IHL field in an IPV4 Header. FIG. 9 depicts an example embodiment of an IPv4 Header 900 including one or more IPv4 Options Headers configured for use to include an RI Option Header in an IPv4 Header for supporting reorderability. The IPv4 Options Headers in the IPv4 Header 900 are appended after the Destination Address field. A variable sized Padding field is appended after the IPv4 Options Headers to round off the IPv4 Header 900 to multiples of 4-octet words.

It will be appreciated that, although omitted for purposes of clarity, an IPv4 Options Header includes a 1-octet Type field followed by type specific data. The Type field is viewed as having three fields as follows: a 1-bit Copied Flag field, a 2-bit Option Class field, and a 5-bit Option Number field. The Copied Flag field indicates that the option is copied into all fragments on fragmentation (e.g., a value of 0=not copied while a value of 1=copied). The Option Classes include: 0=control, 1=reserved for future use, 2=debugging and measurement, and 3=reserved for future use. The Type field may be used to define various types of IPv4 Options.

In one example, reorderability based on use of the RI may be provided using an IPv4 Options Header configured with the Option Type for the RI Option Header (which also may be referred to herein as an "RI Option").

Figure 10:
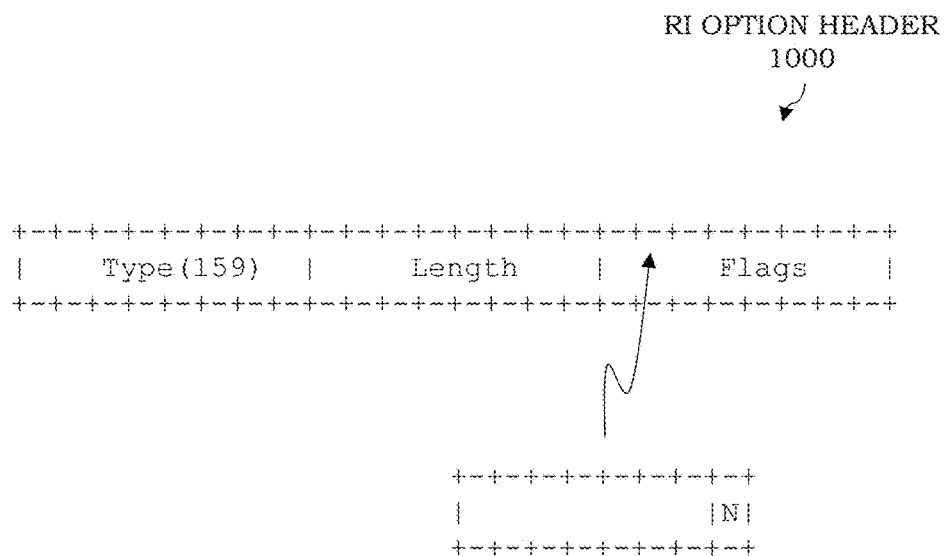
FIG. 10 depicts an example embodiment of an IPv4 Options Header configured for use to provide an RI Option Header in an IPv4 Header for supporting reorderability.

FIG. 10 depicts an example embodiment of an IPv4 Options Header configured for use to provide an RI Option Header 1000 in an IPv4 Header for supporting reorderability.

The RI Option Header 1000 may be defined as follows. The RI Option Header 1000 includes the 1-octet Type field (which is common for any IPv4 Option Header), a 1-octet Length field and a 1-octet Flags field.

The Type field may have a COPY value of "1", a CLASS value of "0", a NUMBER of "31", a LENGTH of "3", and a DESCRIPTION of "Reorderability Indicator—Used to indicate reorderability of an IPv4 packet." This makes the value in the Type field as 159. It will be appreciated that other suitable values may be used for the NUMBER that is used to denote that the IPv4 Options Header is an RI Option Header. The COPY bit is 1, which means that the RI Option Header is copied into all fragments if the IPv4 packet carrying the RI Option Header is fragmented by a router.

The Length field is a 1-octet field that indicates the length of the RI Option Header including the Type octet, the Length octet, and the Flags octet (i.e., this value is set to 3).

The Flags field is a 1-octet field that includes an N-bit. The N-bit may be configured such that N=1 indicates that the IPv4 packet cannot be reordered and if N=0 then the IPv4 packet can be reordered (or vice versa). The rest of the bits in the Flags field will be set to 0 by the sender and ignored by receivers.

In this example, when a router routes an IPv4 packet, the router checks to see if the RI Option Header is present within the IPv4 Header and, if the RI Option Header is present within the IPv4 Header, then, based on the N-bit, the router makes reorderability decisions while forwarding the packet.

It will be appreciated that, although primarily presented with respect to example embodiments in which RI is implemented within an IPv4 Header using an IPv4 Options Header configured as an RI Option Header, in at least some example embodiments RI may be implemented within an IPv4 Header using a generic Hop-by-Hop Options Header. The Hop-by-Hop Options Header may be defined to have the same format as the RI Option Header 1000 of FIG. 10, with the exception that each bit position in the Flags field may encode a binary encoded option (i.e., indicating either "Yes" or "No") that is to be processed by every node in the path of the packet. The bit position 0 in the Flags field may be defined as the RI option (e.g., if the value of bit position 0 is "1" then it means that the IPv4 packet cannot be reordered and if the value of bit position 0 is "0" then it means the IPv4 packet can be reordered, or vice versa). It is noted that one advantage of using the Hop-by-Hop Options Header is that multiple binary encoded options to be processed at each hop can be encoded in a compact manner in the same header.

In at least some example embodiments, the RI may be used within IPv6 packets to control reorderability, and, thus, reordering, of IPv6 packets.

In at least some example embodiments, the RI may be encoded within an IPv6 Extension Header (EH). The IPv6 Specification describes several IPv6 EHs that can be appended to an IPv6 header. The main IPv6 Header remains fixed in size (40 bytes) while customized EHs are added as needed. The EHs provide for control functions needed or useful in some situations but unnecessary for the most common communications. The EHs include provisions for timestamps, security, special routing, and the like. Every EH starts with a 1-octet Next Header field, followed by its own body. The format of the body is dependent on the type of EH. The Next Header field of an EH points to the type of the next EH. So, multiple EHs may be chained together by their Next Header fields. The Next Header field on the last EH in the chain indicates the type of the IPv6 payload.

In at least some example embodiments, the RI may be encoded within the EH referred to as the Hop-by-Hop Options Header, which is described in the IPv6 Specification. The Hop-by-Hop Options Header can be used to carry optional information that will be examined by every router along the delivery path of the packet. It is identified by the value of 0 in the Next Header field of the IPv6 Header. This EH is generic and multiple options can be defined within it. So, any special directive to be examined by every transit router of an IPv6 packet is defined as an option within Hop-by-Hop Options Header. The format of the header is depicted in FIG. 11.

FIG. 11 depicts an example embodiment of an IPv6 Hop-by-Hop Options Header 1100 configured for use to provide an RI Option Header in an IPv6 Header for supporting reorderability.

The IPv6 Hop-by-Hop Options Header 1100 includes a Next Header field, a Header Extension Length (Hdr Ext Len) field, and an Options field.

The Next Header field is an 8-bit selector that identifies the type of header immediately following the IPv6 Hop-by-Hop Options Header 1100.

The Header Extension Length field is an 8-bit unsigned integer. This field specifies the length of the IPv6 Hop-by-Hop Options Header 1100 in 8-octet units, not including the first 8 octets.

The Options field is a variable-length field of length such that the complete IPv6 Hop-by-Hop Options Header 1100 is an integer multiple of 8 octets long. This field includes one or more TLV encoded options, with the format presented in FIG. 12.

FIG. 12 depicts an example embodiment of a TLV encoded option 1200 configured for use in an IPv6 Hop-by-Hop Options Header (e.g., Hop-by-Hop Options Header 1100 of FIG. 11) in an IPv6 Header to provide an RI Option Header in an IPv6 Header for supporting reorderability.

The TLV encoded option 1200 for the IPv6 Hop-by-Hop Options Header includes an Option Type field, an Option Data Length (Opt Data Len) field, and an Options Data field.

The Option Type field includes an 8-bit identifier of the type of options. The Option Data Length field includes an 8-bit unsigned integer that specifies the length of the Option Data field of the option in octets. The Option Data field is a variable-length field that includes Option-Type-specific data. It is noted that the sequence of options within a header is expected to be processed strictly in the order in which the options appear in the header (e.g., it is expected that a receiver will not, for example, scan through the header looking for a particular kind of option and process that option prior to processing any preceding options).

The Option Type identifiers are internally encoded such that their highest-order two bits specify the action that must be taken if the IPv6 node does not recognize the Option Type. For example, the following values may be used: (1) 00=skip over this option and continue processing the header, (2) 01=discard the packet, (3) 10=discard the packet and, regardless of whether or not the Destination Address of the packet was a multicast address, send an ICMP Parameter Problem Code 2 message, pointing to the unrecognized Option Type, to the Source Address of the packet, and (4) 11=discard the packet and, only if the Destination Address of the packet was not a multicast address, send an ICMP Parameter Problem Code 2 message, pointing to the unrecognized Option Type, to the Source Address of the packet. It will be appreciated that the values may be defined in other ways.

The Option Type identifiers are internally encoded such that the third-highest-order bit of the Option Type specifies whether or not the Option Data of that option can change en-route to the final destination of the packet. When an Authentication header (another type of EH that carries an authentication digest of the packet) is present in the packet, for any option whose data may change en-route, the entire Option Data field of the packet will be treated as zero-valued octets when computing or verifying the authentication digest of the packet. For example, the following values may be used: (1) 0=Option Data does not change en-route and (2) 1=Option Data may change en-route. It will be appreciated that the values may be defined in other ways.

The Option Type identifiers are internally encoded such that the three high-order bits described above are to be treated as part of the Option Type, not independent of the Option Type. That is, a particular option is identified by a full 8-bit Option Type, not just the low-order 5 bits of an Option Type.

In one example, reorderability based on use of the RI may be provided using the Option Type for the IPv6 Hop-by-Hop Options Header (which may be referred to herein as an "RI Option Header").

FIG. 13 depicts an example embodiment of a TLV encoded option of an IPv6 Hop-by-Hop Options Header configured for use as an RI Option Header 1300 in an IPv6 Header.

The RI Option Header 1300 includes an Option Type field, an Option Data Length (Opt Data Len) field, and a Flags field.

The Option Type field of the RI Option Header 1300 encodes the option type in a manner that indicates that the Option Type is RI Option. The highest-order 2-bits are encoded with the value 00, which means skip over this option and continue processing the header (i.e., if a receiver does not recognize the RI Option, then the receiver should ignore the RI Option). The third highest order bit is encoded with the value 0, which means that the data cannot change en-route, because the reorderability preference of the packet cannot change en-route. The remaining 5-bits are assigned the value 10010, which results in the value of the Option Type field being 0×32. It will be appreciated that other suitable values may be used.

The Option Data Length field of the RI Option Header 1300 indicates the length of the Flags field of the RI Option and, thus, has a value of 1.

The Flags field of the RI Option Header 1300 is a 1-octet field that includes an N-bit. The N-bit may be configured such that N=1 indicates that the IPv6 packet cannot be reordered and if N=0 then the IPv6 packet can be reordered (or vice versa). The rest of the bits in the Flags field will be set to 0 by the sender and ignored by receivers.

In this example, when a router routes an IPv6 packet, the router checks to see if the RI Option Header is present within the IPv6 Header and, if the RI Option Header is present within the IPv6 Header, then, based on the N-bit, the router makes reorderability decisions while forwarding the packet.

In at least some example embodiments, the RI may be used within Ethernet packets to control reorderability, and, thus, reordering, of Ethernet packets.

Figure 14:
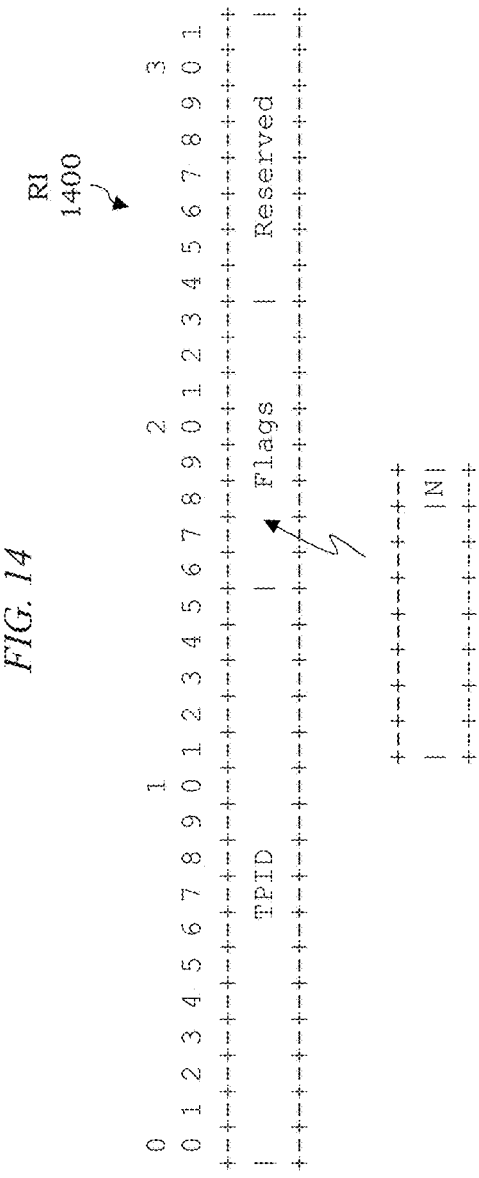
FIG. 14 depicts an example embodiment of an RI which may be used within Ethernet packets.

FIG. 14 depicts an example embodiment of an RI which may be used within Ethernet packets.

The RI 1400 includes a Tag Protocol Identifier (TPID) field, a Flags field, and a Reserved field.

The TPID field is a 16-bit field set to a value in order to identify the packet carried as RI. This field is located at the same position as the EtherType field in untagged frames and, thus, may be used to distinguish the presence of RI from untagged frames or tagged frames. The value that is used may be reserved from the IEEE 802 Numbers Registry in IANA (e.g., 0xB000 or any other suitable value).

The Flags field is an 8-bit that defines various flags for operations on RI. The Flags field includes an N-bit. The N-bit may be configured such that N=1 indicates that the Ethernet packet cannot be reordered and if N=0 then the Ethernet packet can be reordered (or vice versa). The rest of the bits in the Flags field will be set to 0 by the sender and ignored by receivers.

The Reserved field is a 1-octet field that is set to 0 by the sender and ignored by receivers.

It is noted that, although primarily presented with respect to example embodiments in which the RI is appended to the Ethernet header on which the RI is applicable, in at least some example embodiments the RI may be positioned in other locations with respect to the Ethernet header.

Figure 15:
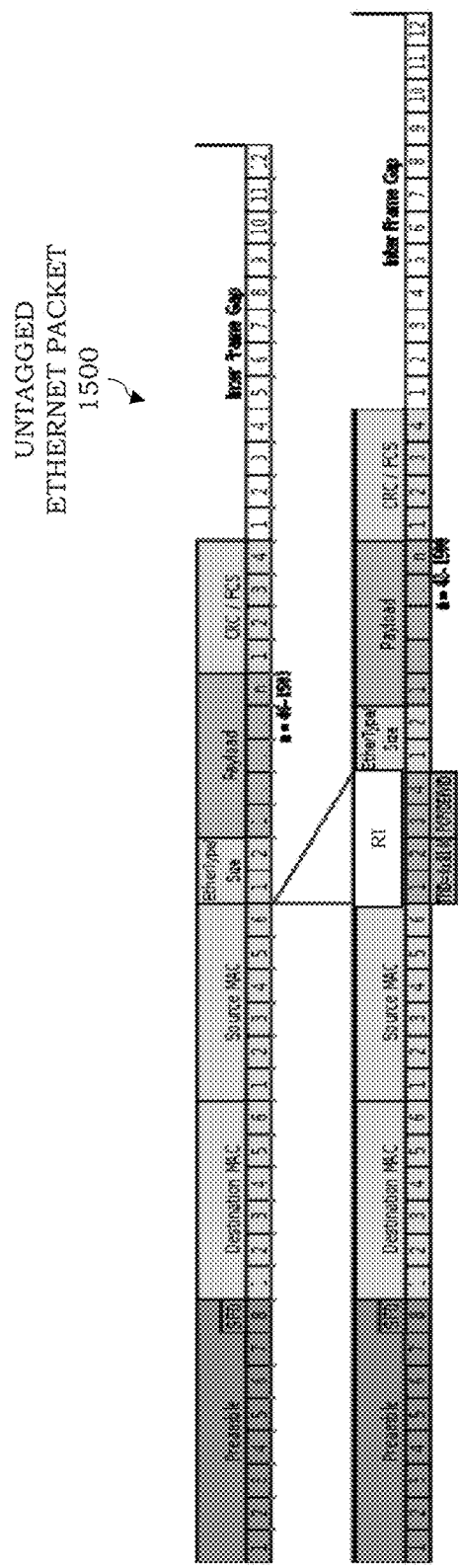
FIG. 15 depicts an example embodiment of insertion of an RI into an untagged Ethernet packet.

FIG. 15 depicts an example embodiment of insertion of an RI into an untagged Ethernet packet. The untagged Ethernet packet 1500 is considered to be untagged in that it does not include any VLAN tags or other extra headers after the Ethernet header. In the untagged Ethernet packet 1500, the RI is inserted between the Source MAC Address field and the EtherType field. Here, since the TPID in RI now takes the position of EtherType field, so TPID indicates that an RI is present. The EtherType field of the Ethernet header that determines the payload type of the Ethernet packet now moves after the RI.

Figure 16:
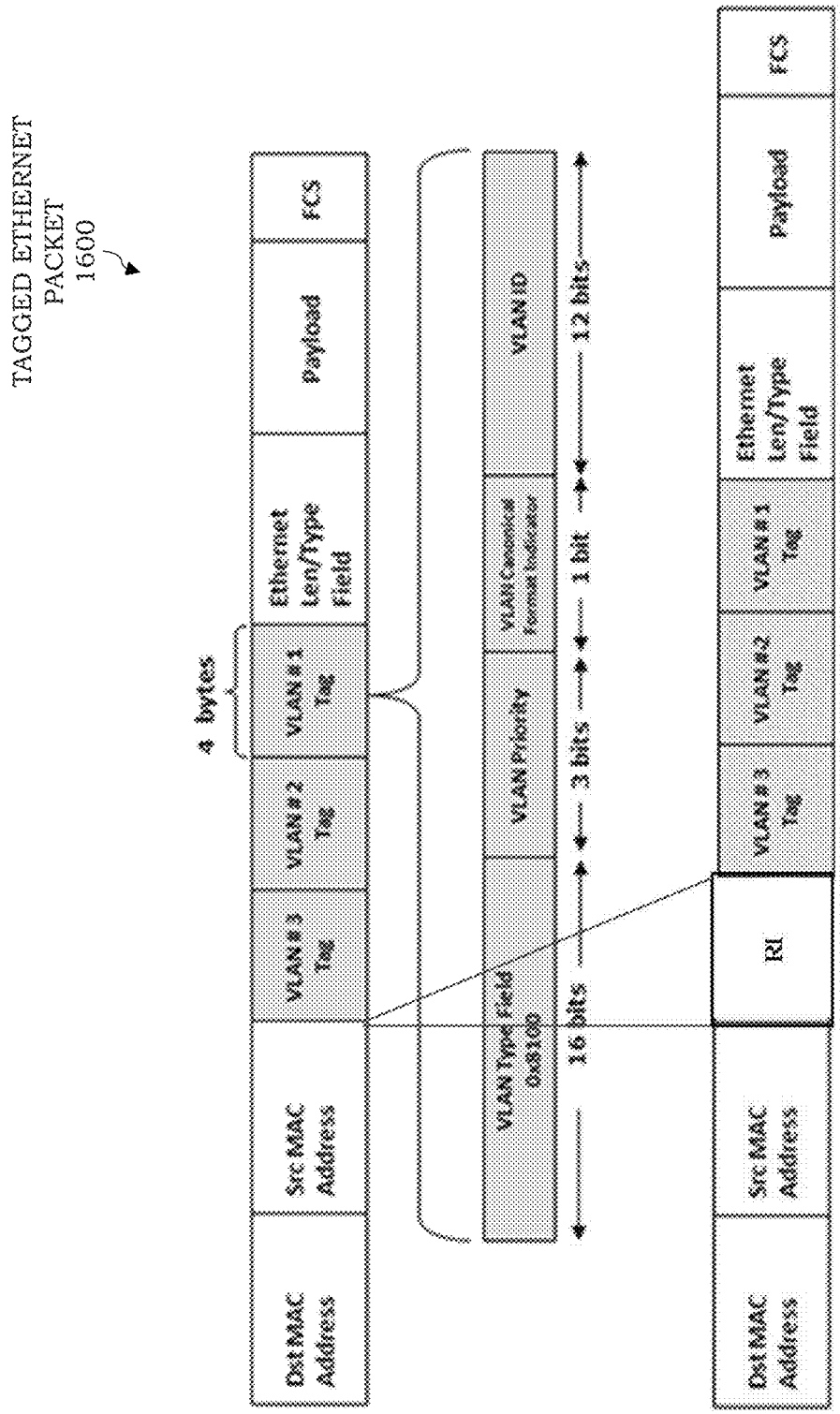
FIG. 16 depicts an example embodiment of insertion of an RI into a tagged Ethernet packet.

FIG. 16 depicts an example embodiment of insertion of an RI into a tagged Ethernet packet. The tagged Ethernet packet 1600 is considered to be tagged in that it includes three VLAN tags (VLAN stacking). In the tagged Ethernet packet, the RI is inserted between the Source MAC Address field and the outermost VLAN tag.

In this example, the RI, if present, is inserted after the Ethernet header. If any other Ethernet layer specific headers are present after the Ethernet header, then those Ethernet layer specific headers get appended to the RI. For example, in FIG. 16, the VLAN stack is now positioned after the RI.

It is noted that, since the TPID in the RI takes the position of the EtherType, then a processing bridge, based on the TPID in the RI, determines that the next header is the RI and will look for the EtherType at the end of the RI. Additionally, since VLAN Type in the VLAN header takes the position of EtherType, then the processing bridge, based on the VLAN type, determines that a VLAN header is present. So, if the RI is present, then a processing bridge looks at the EtherType field after the RI to determine if other Ethernet specific headers are present.

In this example, when a processing bridge forwards an Ethernet packet, the processing bridge checks to see if the RI is present within the header and, if the RI is present, then, based on the N-bit, the processing bridge makes reorderability decisions while forwarding the packet.

It will be appreciated that, although primarily presented with respect to example embodiments in which RI is implemented within an Ethernet packet using a particular RI Option format, in at least some example embodiments RI may be implemented within an Ethernet packet using a Generic Options Header. The Generic Options Header may be defined to have the same format as the RI 1400 of FIG. 14, with the exception that the TPID indicates the Generic Option Header and each bit position in the Flags field may encode a binary encoded option (i.e., indicating either "Yes" or "No"). The bit position 0 in the Flags field may be defined as the RI option (e.g., if the value of bit position 0 is "1" then it means that the Ethernet packet cannot be reordered and if the value of bit position 0 is "0" then it means the Ethernet packet can be reordered, or vice versa). It is noted that one advantage of using the Generic Options Header is that multiple options including the RI can be encoded in a compact manner in the Flags field.

In at least some example embodiments, the RI may be used within MPLS packets to control reorderability, and, thus, reordering, of MPLS packets.

In at least some example embodiments, the RI may be encoded within a special label which may be referred to as an RI label.

FIG. 17 depicts an example embodiment of an RI Label which may be used within an MPLS label stack in an MPLS packet.

The RI Label 1700 is a special label defined for supporting use of the RI. The RI Label includes an RI field, an Exp field, an S-bit, and a TTL/Flags field.

The RI field may include any value suitable for indicating that the label is an RI Label. For example, a value of RI can be reserved at the IANA registry on Special-purpose labels, or any other suitable value may be used.

The Exp field will be set to 0 and a receiving router will ignore this field. The sending router and receiving router of RI will use the EXP field of the label underneath the RI for mapping to the appropriate forwarding class.

The S-bit will be set to 0 since the label of the associated LSP, for which reorderability is indicated, follows.

The TTL/Flags field is not used for its defined purpose as a TTL field, but, rather, is being repurposed as a Flags field (hence the reason it is referred to as a TTL/Flags field). The TTL/Flags field includes an N-bit. The N-bit may be configured such that N=1 indicates that the MPLS packet cannot be reordered while forwarding in the context of the LSP identified by the LSP Label underneath, and if N=0 then the MPLS packet can be reordered (or vice versa). The rest of the bits in the Flags field will be set to 0 by the sender and ignored by receivers.

It will be appreciated that, although primarily presented with respect to example embodiments in which RI is implemented within an MPLS packet using a particular RI Label format, in at least some example embodiments RI may be implemented within an MPLS packet using a Generic Options Label. The Generic Options Label may be defined to have the same format as the RI Label 1700 of FIG. 17, with the exception that the RI field is replaced with a Generic Options field which encodes a special value that indicates the label as the Generic Options Label and each bit position in the Flags field may encode a binary encoded option (i.e., indicating either "Yes" or "No"). The bit position 0 in the Flags field may be defined as the RI option (e.g., if the value of bit position 0 is "1" then it means that the MPLS packet cannot be reordered and if the value of bit position 0 is "0" then it means the MPLS packet can be reordered, or vice versa). It is noted that one advantage of using the Generic Options Label is that multiple options including the RI can be encoded in a compact manner in the same label.

In MPLS, it may be possible to send a packet along a hierarchy of MPLS networks. In that case, if a RI is present in an LSP in the hierarchy, then the RI will be included in all LSPs lower in the hierarchy.

FIG. 18 depicts an example embodiment of an MPLS label stack for illustrating cross-layer propagation of RI. The MPLS label stack 1800 includes a stack of N LSPs. In this example, assume that, originally, only LSP 1 included the RI. When LSP 1 is transported over another LSP, e.g., LSP 2, then the RI is propagated to LSP 2 as well. In this manner, more generally, if LSP 1 is overlaid upon (N-1) LSPs. then each of the (N-1) LSPs inherits the RI as well. This ensures consistent reordering decisions across all (N-1) LSPs below LSP 1.

In at least some example embodiments, cross-layer propagation of RI with a packet may be supported for consistent reorderability decisions for the packet.

The cross-layer propagation of RI from a current layer of a packet to lower layers of a packet ensures that forwarding nodes at each layer below the current layer can make consistent decisions on reorderability of the packet. A packet originated with an RI may be sent atop multiple layers, each layer adding encapsulation for its network. The layers can be homogeneous, such as in IP-in-IP, Ethernet-in-Ethernet (e.g., MAC-in-MAC, IEEE 802.1ah, or the like), an MPLS hierarchy (e.g., as shown in FIG. 16), or the like. The layers can be heterogeneous, such as IP-in-MPLS, IP-in-MPLS-in-Ethernet, or the like. In such cases, both homogenous and heterogeneous, the RI will be propagated to the headers of all the lower layers so that forwarding nodes at every layer below can make consistent decision on reorderability of the packet. This cross-layer propagation may be further understood with respect to the following examples.

The cross-layer propagation of RI from a current layer of a packet to lower layers of a packet, which ensures that forwarding nodes at each layer below the current layer can make consistent decisions on reorderability of the packet, may be further understood by considering the following examples. As a first example, assume that a host is originating a packet for a TCP/IP based application that has reorderability preference. The host, based on the reorderability preference, includes the RI in the IP header of the packet. Then the packet is sent to the next-hop in the IP network over the data link layer. So, the RI should be also propagated to the data link layer if the data link layer is not a point-to-point network, such as Ethernet. In that case, RI needs to be encoded into the Ethernet header, so that the Ethernet network is consistent on reorderability of the packet. It is also possible that the IP packet is tunneled over another IP network, such as by using a GRE tunneling mechanism. In that case, the IP header of the tunnel (i.e., the outermost IP header of the resultant packet) inherits the RI included in the IP packet from the host. In a second example, the IP packet from a host may be transported over an MPLS LSP in the packet switched network and, in that case, the MPLS LSP inherits the RI from the IP packet from the host. It will be appreciated that these are merely two of the various ways in which the RI may be propagated between layers to ensure that forwarding nodes can make consistent decisions on packet reorderability.

Figure 19:
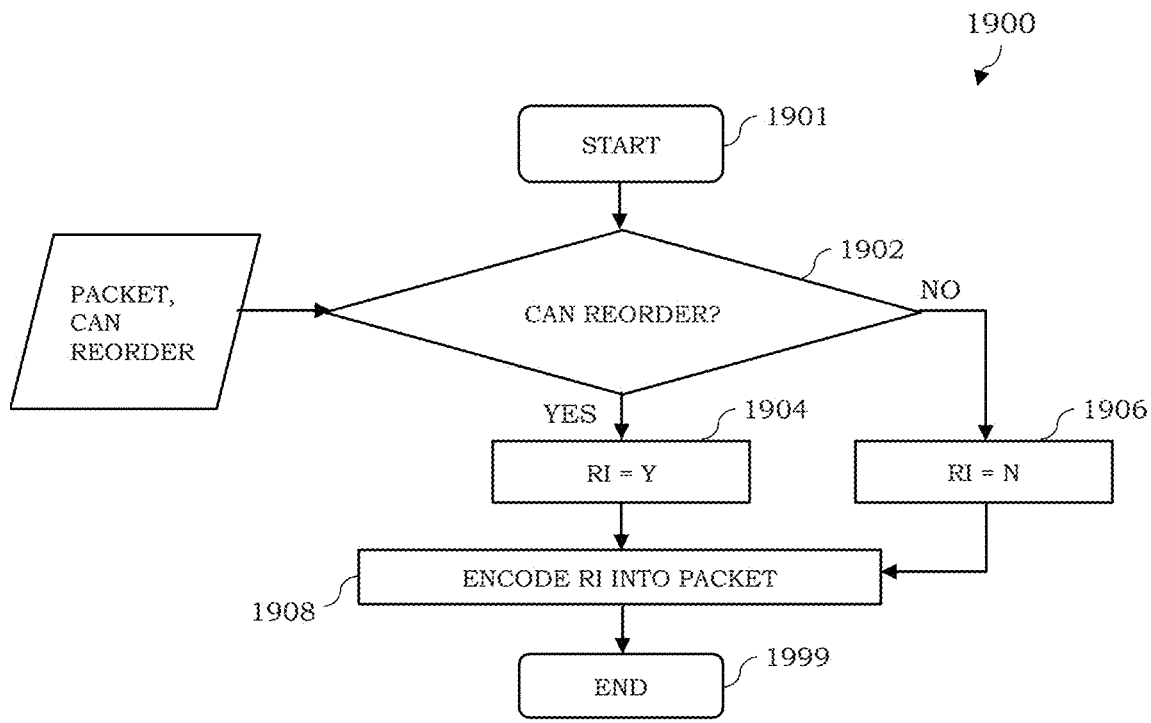
FIG. 19 depicts an example embodiment of a method for use by a node to support use of an RI for controlling reorderability in a packet switched network.

FIG. 19 depicts an example embodiment of a method for use by a node to support use of an RI for controlling reorderability in a packet switched network. The node may be an originating node that may originate a packet including an RI, a transit node that may insert an RI into a packet (e.g., based on a policy configured in the node, such as where the packet matches a flow configured in the node and the policy indicates reorderability of the flow), or the like. It will be appreciated that, although primarily presented herein as being performed serially, at least a portion of the functions of method 1900 may be performed contemporaneously or in a different order than as presented in FIG. 19. The inputs to the method 1900 include a packet that is originated and an indication as to whether or the packet can be reordered en-route to the destination (e.g. a Boolean indicator or other suitable indicator). At block 1901, the method 1900 begins. Block 1902 checks if the packet is allowed to be reordered. If the packet is allowed to be reordered then the method 1900 proceeds to block 1904, otherwise the method 1900 proceeds to block 1906. Block 1904 creates an RI with reorderability set to 'yes', and then the method 1900 proceeds to block 1908. Block 1906 creates an RI with reorderability set to 'no', and then the method 1900 proceeds to block 1908. Block 1908 encodes the RI into the packet. At block 1999, the method 1900 ends.

Figure 20:
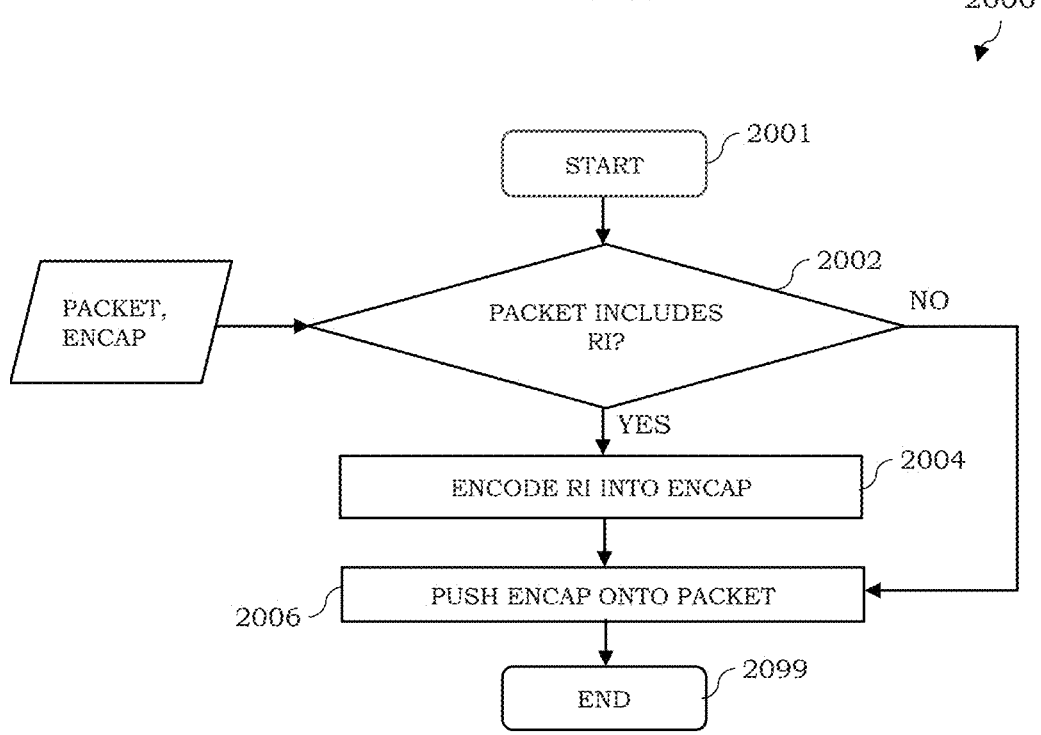
FIG. 20 depicts an example embodiment of a method for use by a node to support cross-layer propagation of an RI for controlling reorderability in a packet switched network.

FIG. 20 depicts an example embodiment of a method for use by a node to support cross-layer propagation of an RI for controlling reorderability in a packet switched network. The method 2000 may be performed by a host node or any node in the network that pushes an encapsulation of a lower layer onto a packet. It will be appreciated that, although primarily presented herein as being performed serially, at least a portion of the functions of method 2000 may be performed contemporaneously or in a different order than as presented in FIG. 20. The inputs to the method 2000 include a packet on which an encapsulation of a lower layer is pushed and an encapsulation of the lower layer. At block 2001, the method 2000 begins. Block 2002 checks if the packet includes an RI. If the packet includes an RI then the method 2000 proceeds to block 2004, otherwise the method 2000 proceeds to block 2006. Block 2004 encodes the RI into the encapsulation, as per the format of the RI defined for the encapsulation, and then the method 2000 proceeds to block 2006. Block 2006 pushes the encapsulation onto the packet. The method 2000 proceeds to block 2099, where the method 2000 ends.

Figure 21:
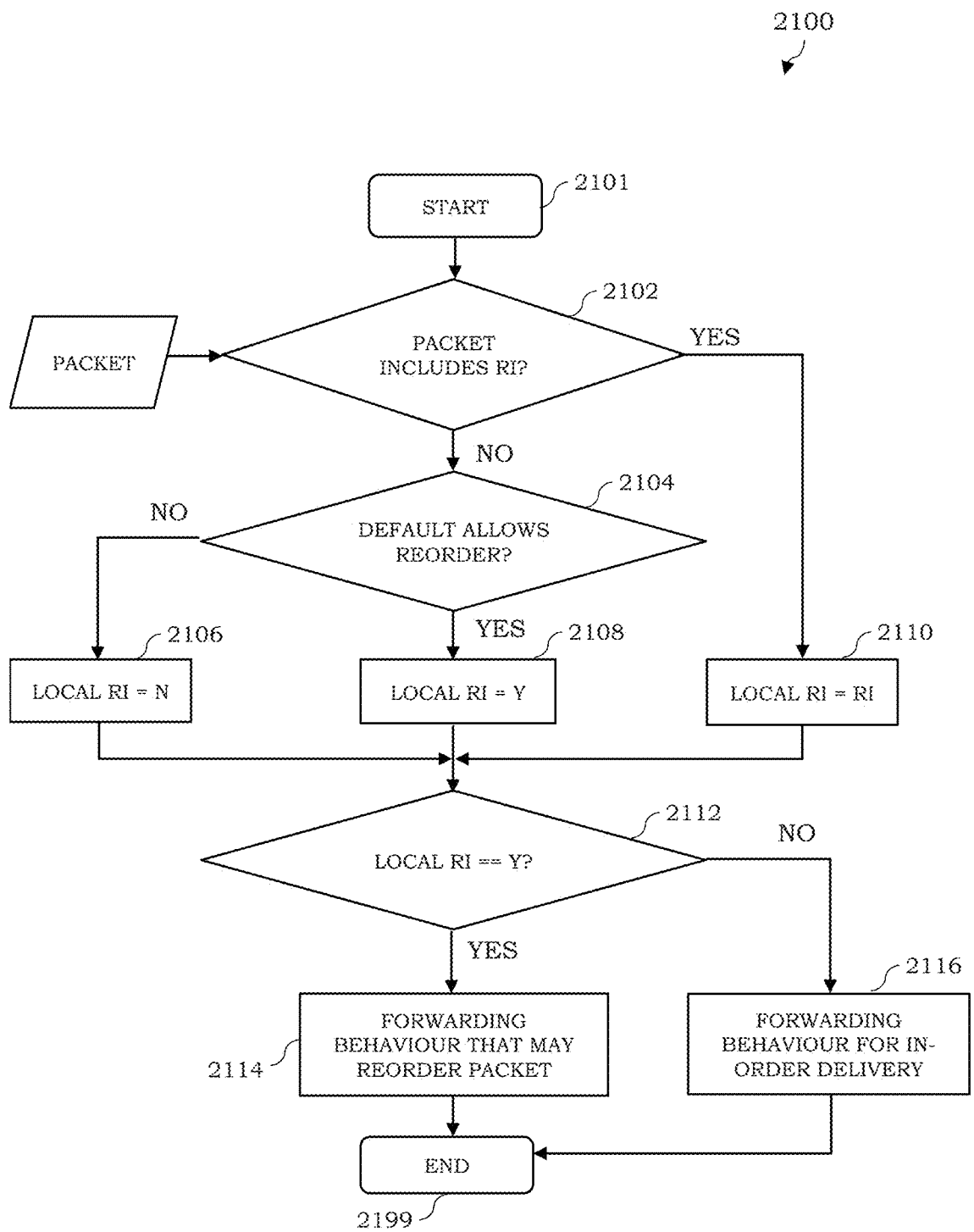
FIG. 21 depicts an example embodiment of a method for use by a node to forward a packet in a manner for controlling reorderability in a packet switched network.

FIG. 21 depicts an example embodiment of a method for use by a node to forward a packet in a manner for controlling reorderability in a packet switched network. It will be appreciated that, although primarily presented herein as being performed serially, at least a portion of the functions of method 2100 may be performed contemporaneously or in a different order than as presented in FIG. 21. The inputs to the method 2100 include a packet to be forwarded by the node. At block 2101, the method 2100 begins. Block 2102 checks if the packet includes an RI. If the packet includes an RI then the method 2100 proceeds to block 2110, otherwise the method 2100 proceeds to block 2104. Block 2110 parses the RI from the packet into a local variable, which is referred to as local_RI, and then the method 2100 proceeds to block 2112. Block 2104 checks if the default behavior of the node is to allow reordering of packets (e.g., the node performs per-packet load balancing by default). If the default behavior of the node is to allow reordering then the method 2100 proceeds to block 2108, otherwise the method 2100 proceeds to block 2106. Block 2108 sets the local_RI to allow reordering, and then the method 2100 proceeds to block 2112. Block 2106 sets the local_RI to disallow ordering, and then the method 2100 proceeds to step 2112. Block 2112 checks if the local_RI is set to allow reordering. If the local_RI is set to allow reordering then the method proceeds to block 2114, otherwise the method 2100 proceeds to block 2116. Block 2114 forwards the packet in a way that may reorder the packet (e.g., applying per-packet load balancing), and then the method 2100 proceeds to block 2199 where the method 2100 ends. Block 2116 forwards the packet in a way that ensures in order delivery of the packet (e.g., applying per-flow load balancing), and then the method 2100 proceeds to block 2199 where the method 2100 ends.

Figure 22:
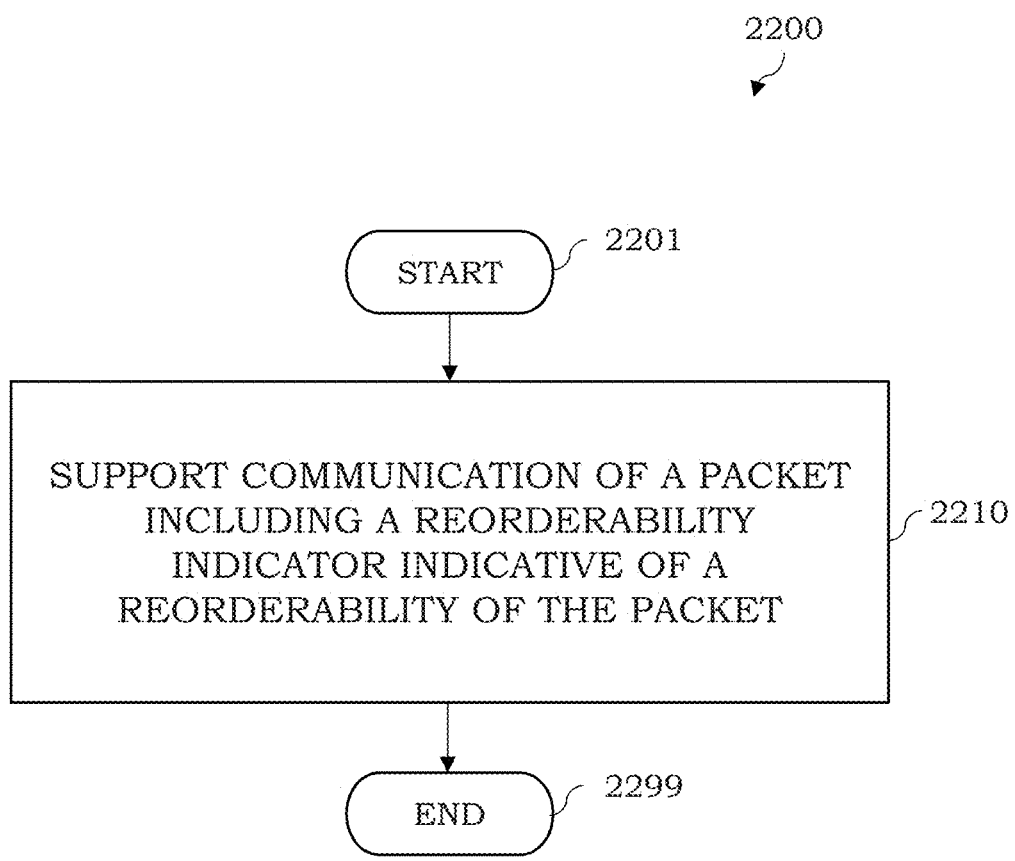
FIG. 22 depicts an example embodiment of a method for supporting reordering in a packet switched network.

FIG. 22 depicts an example embodiment of a method for supporting reordering in a packet switched network. It will be appreciated that although primarily presented as being performed serially, at least a portion of the blocks of method 2200 may be performed contemporaneously or in a different order than as presented in FIG. 22. At block 2201, the method 2200 begins. At block 2210, support communication of a packet including a reorderability indicator indicative of a reorderability of the packet. The reorderability indictor may be included in the packet by a source of the packet or by a forwarding node along a path traversed by the packet. The reorderability indicator may be indicative as to whether reordering of the packet is permitted. The reorderability indicator may be indicative as to whether reordering of the packet is permitted with respect to a flow with which the packet is associated. The reorderability indicator may be indicative that reordering of the packet is not permitted, in which case support for communication may include sending the packet using per-flow load balancing. The reorderability indicator may be indicative that reordering of the packet is permitted, in which case support for communication may include sending the packet using per-packet load balancing. The support for communication of the packet may include determining that the packet may need to be reordered relative to a second packet received after the packet and transmitting the packet before the second packet based on a determination that the reorderability indicator of the packet indicates that reordering of the packet is not permitted. The support for communication of the packet may include determining that the packet may need to be reordered relative to a second packet received after the packet and transmitting the second packet before the packet based on a determination that the reorderability indicator of the packet indicates that reordering of the packet is permitted. The support for communication of the packet may include receiving, by a node having a default behavior of enforcing in-order delivery of packets, the packet and a second packet, wherein the second packet is received after the packet, determining, by the node, that the reorderability indicator of the packet indicates that the packet is permitted to be reordered, and transmitting, by the node, the packet and the second packet such that the packet is transmitted after the second packet. The support for communication of the packet may include receiving, by a node having a default behavior of allowing reordering of packet, the packet and a second packet, wherein the second packet is received after the packet, determining, by the node, that the reorderability indicator of the packet indicates that the packet is not permitted to be reordered, and transmitting, by the node, the packet and the second packet such that the packet is transmitted before the second packet. The reorderability indicator may be encoded within an Internet Protocol version 4 (IPv4) Options Header. The reorderability indicator may be encoded within an Internet Protocol version 6 (IPv6) Extension Header (EH). The IPv6 EH may be a Hop-by-Hop Options Header. The reorderability indicator may be encoded within a reorderability indicator tag. The reorderability indictor tag may be appended to an Ethernet header to which the reorderability indicator is applicable. The reorderability indictor tag may be appended to a virtual local area network (VLAN) tag to which the reorderability indicator is applicable. The reorderability indicator may be encoded within a Multiprotocol Label Switching (MPLS) label. The MPLS label may be positioned above a label of a label switched path (LSP) to which the reorderability indicator is applicable. The MPLS label may be positioned below a label of a label switched path (LSP) to which the reorderability indicator is applicable. The support for communication of the packet may include determining that the packet, which is associated with a first communication layer, is to be encapsulated by an encapsulation at a second communication layer and encoding the reorderability indicator into the encapsulation at the second communication layer. The first communication layer and the second communication layer may use a common communication protocol. The first communication layer and the second communication layer may use different communication protocols. At block 2299, the method 2200 ends.

Figure 23:
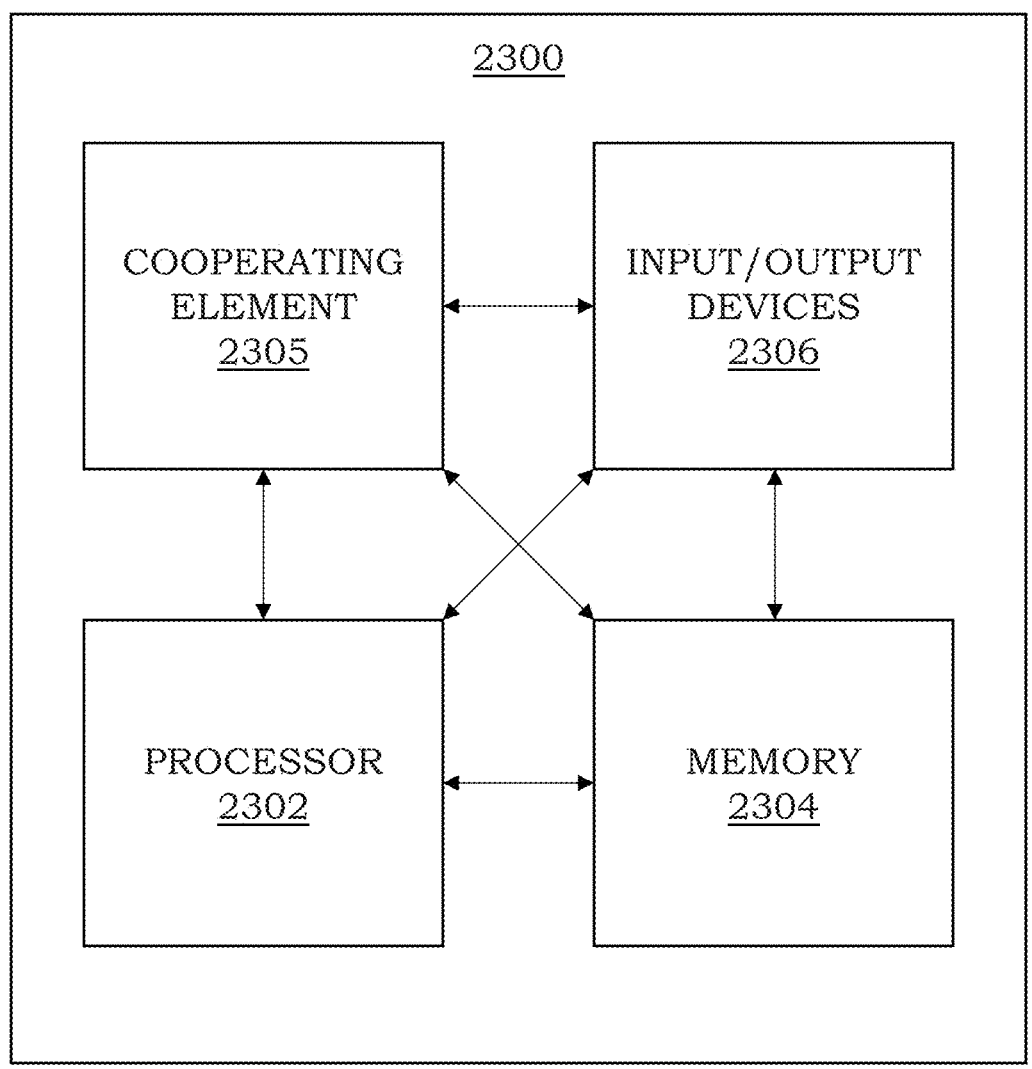
FIG. 23 depicts an example embodiment of a computer suitable for use in performing various functions presented herein.

FIG. 23 depicts an example embodiment of a computer suitable for use in performing various functions presented herein.

The computer 2300 includes a processor 2302 (e.g., a central processing unit (CPU), a processor, a processor having a set of processor cores, a processor core of a processor, or the like) and a memory 2304 (e.g., a random access memory, a read only memory, or the like). The processor 2302 and the memory 2304 may be communicatively connected. In at least some example embodiments, the computer 2300 may include at least one processor and at least one memory including computer program code, wherein the at least one memory and the computer program code are configured to, with the at least one processor, cause the computer to perform various functions presented herein.

The computer 2300 also may include a cooperating element 2305. The cooperating element 2305 may be a hardware device. The cooperating element 2305 may be a process that can be loaded into the memory 2304 and executed by the processor 2302 to implement various functions presented herein (in which case, for example, the cooperating element 2305 (including associated data structures) can be stored on a non-transitory computer-readable storage medium, such as a storage device or other suitable type of storage element (e.g., a magnetic drive, an optical drive, or the like)).

The computer 2300 also may include one or more input/output devices 2306. The input/output devices 2306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2300 may represent a general architecture and functionality suitable for implementing functional elements described herein, portions of functional elements described herein, or the like, as well as various combinations thereof. For example, computer 2300 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus comprising:
   at least one processor; and
   at least one memory including computer program code;
   wherein the at least one memory and the computer program code are configured to, with the at least one processor, cause the apparatus to:
      support communication of a packet including a reorderability indicator indicative of a reorderability of the packet, wherein the support for communication of the packet includes:
         determining, based on the reorderability indicator, a type of load balancing to apply for forwarding the packet;
         determining that the packet, which is associated with a first communication layer, is to be encapsulated by an encapsulation at a second communication layer; and
         encoding the reorderability indicator into the encapsulation at the second communication layer.

2. The apparatus of claim 1, wherein the reorderability indictor is indicative as to whether reordering of the packet is permitted.

3. The apparatus of claim 1, wherein the reorderability indicator is indicative as to whether reordering of the packet is permitted with respect to a flow with which the packet is associated.

4. The apparatus of claim 1, wherein the reorderability indicator is indicative that reordering of the packet is not permitted.

5. The apparatus of claim 4, wherein, to support communication of the packet, the at least one memory and the computer program code are configured to, with the at least one processor, cause the apparatus to send the packet using per-flow load balancing.

6. The apparatus of claim 1, wherein the reorderability indicator is indicative that reordering of the packet is permitted.

7. The apparatus of claim 6, wherein, to support communication of the packet, the at least one memory and the computer program code are configured to, with the at least one processor, cause the apparatus to send the packet using per-packet load balancing.

8. The apparatus of claim 1, wherein, to support communication of the packet, the at least one memory and the computer program code are configured to, with the at least one processor, cause the apparatus to:
   determine that the packet may need to be reordered relative to a second packet received after the packet; and
   transmit the packet before the second packet based on a determination that the reorderability indicator of the packet indicates that reordering of the packet is not permitted.

9. The apparatus of claim 1, wherein, to support communication of the packet, the at least one memory and the computer program code are configured to, with the at least one processor, cause the apparatus to:
   determine that the packet may need to be reordered relative to a second packet received after the packet; and
   transmit the second packet before the packet based on a determination that the reorderability indicator of the packet indicates that reordering of the packet is permitted.

10. The apparatus of claim 1, wherein, to support communication of the packet, the at least one memory and the computer program code are configured to, with the at least one processor, cause the apparatus to:
    receive, by a node having a default behavior of enforcing in-order delivery of packets, the packet and a second packet, wherein the second packet is received after the packet;
    determine, by the node, that the reorderability indicator of the packet indicates that the packet is permitted to be reordered; and
    transmit, by the node, the packet and the second packet such that the packet is transmitted after the second packet.

11. The apparatus of claim 1, wherein, to support communication of the packet, the at least one memory and the computer program code are configured to, with the at least one processor, cause the apparatus to:
    receive, by a node having a default behavior of allowing reordering of packet, the packet and a second packet, wherein the second packet is received after the packet;
    determine, by the node, that the reorderability indicator of the packet indicates that the packet is not permitted to be reordered; and
    transmit, by the node, the packet and the second packet such that the packet is transmitted before the second packet.

12. The apparatus of claim 1, wherein the reorderability indicator is encoded within an Internet Protocol version 4 (IPv4) Options Header.

13. The apparatus of claim 1, wherein the reorderability indicator is encoded within an Internet Protocol version 6 (IPv6) Extension Header (EH).

14. The apparatus of claim 13, wherein the IPv6 EH is a Hop-by-Hop Options Header.

15. The apparatus of claim 1, wherein the reorderability indicator is encoded within a reorderability indicator tag.

16. The apparatus of claim 15, wherein the reorderability indictor tag is appended to an Ethernet header to which the reorderability indicator is applicable.

17. The apparatus of claim 15, wherein the reorderability indictor tag is appended to a virtual local area network (VLAN) tag to which the reorderability indicator is applicable.

18. The apparatus of claim 1, wherein the reorderability indicator is encoded within a Multiprotocol Label Switching (MPLS) label.

19. The apparatus of claim 18, wherein the MPLS label is positioned above a label of a label switched path (LSP) to which the reorderability indicator is applicable.

20. The apparatus of claim 18, wherein the MPLS label is positioned below a label of a label switched path (LSP) to which the reorderability indicator is applicable.

21. The apparatus of claim 1, wherein the first communication layer and the second communication layer use a common communication protocol.

22. The apparatus of claim 1, wherein the first communication layer and the second communication layer use different communication protocols.

23. A non-transitory computer-readable medium including computer program code configured to cause an apparatus to:
    support communication of a packet including a reorderability indicator indicative of a reorderability of the packet, wherein the support for communication of the packet includes:
       determining, based on the reorderability indicator, a type of load balancing to apply for forwarding the packet;
       determining that the packet, which is associated with a first communication layer, is to be encapsulated by an encapsulation at a second communication layer; and
       encoding the reorderability indicator into the encapsulation at the second communication layer.

24. A method comprising:
    supporting communication of a packet including a reorderability indicator indicative of a reorderability of the packet, wherein supporting communication of the packet includes:
       determining, based on the reorderability indicator, a type of load balancing to apply for forwarding the packet;
       determining that the packet, which is associated with a first communication layer, is to be encapsulated by an encapsulation at a second communication layer; and
       encoding the reorderability indicator into the encapsulation at the second communication layer.

* * * * *